US009752959B2

(12) United States Patent
DeSilva et al.

(10) Patent No.: US 9,752,959 B2
(45) Date of Patent: Sep. 5, 2017

(54) NONINTRUSIVE TRANSCEIVER AND METHOD FOR CHARACTERIZING TEMPERATURE AND VELOCITY FIELDS IN A GAS TURBINE COMBUSTOR

(71) Applicant: Siemens Energy, Inc., Orlando, FL (US)

(72) Inventors: Upul P. DeSilva, Oviedo, FL (US); Heiko Claussen, North Brunswick, NJ (US)

(73) Assignee: Siemens Energy, Inc., Orlando, FL (US)

( * ) Notice: Subject to any disclaimer, the term of this patent is extended or adjusted under 35 U.S.C. 154(b) by 543 days.

(21) Appl. No.: 14/341,924

(22) Filed: Jul. 28, 2014

(65) Prior Publication Data

US 2015/0260611 A1    Sep. 17, 2015

Related U.S. Application Data

(63) Continuation-in-part of application No. 14/207,803, filed on Mar. 13, 2014.

(51) Int. Cl.
*G01F 1/66*     (2006.01)
*G01M 15/14*   (2006.01)
*G01N 29/07*   (2006.01)

(52) U.S. Cl.
CPC ............. *G01M 15/14* (2013.01); *G01F 1/662* (2013.01); *G01N 29/07* (2013.01); *G01F 1/667* (2013.01)

(58) Field of Classification Search
CPC ......... F05D 2270/303; F05D 2270/804; F05D 2270/806; G01M 15/14; G01K 7/42; G01F 25/0007; G01F 1/667

(Continued)

(56) References Cited

U.S. PATENT DOCUMENTS 2,582,232 A      1/1952   Cesaro et al.
3,818,757 A  *   6/1974   Brown .................... G01F 1/667
                                                    73/861.28

(Continued)

FOREIGN PATENT DOCUMENTS

EP          113961 A1     7/1984
EP          125061 A     11/1984

(Continued)

OTHER PUBLICATIONS

All citations of non-patent literature are of related applications before the US Patent and Trademark Office: "Active Temperature Monitoring in Gas Turbine Combustors", filed on Dec. 18, 2013, U.S. Appl. No. 14/132,001.

(Continued)

*Primary Examiner* — William H Rodriguez

(57) ABSTRACT

An acoustic transceiver is implemented for measuring acoustic properties of a gas in a turbine engine combustor. The transceiver housing defines a measurement chamber and has an opening adapted for attachment to a turbine engine combustor wall. The opening permits propagation of acoustic signals between the gas in the turbine engine combustor and gas in the measurement chamber. An acoustic sensor mounted to the housing receives acoustic signals propagating in the measurement chamber, and an acoustic transmitter mounted to the housing creates acoustic signals within the measurement chamber. An acoustic measurement system includes at least two such transceivers attached to a turbine engine combustor wall and connected to a controller.

16 Claims, 15 Drawing Sheets

(58) Field of Classification Search
USPC .......... 701/100; 702/45, 48, 50, 54, 79, 130,
702/142, 176; 374/141, 117–119, 120,
374/45, 147, 144; 73/861.18–861.31,
73/204.11–204.27, 587, 597, 598, 602,
73/645, 660, 112.01
See application file for complete search history.

(56) References Cited

U.S. PATENT DOCUMENTS

| | | | |
|---|---|---|---|
| 4,320,666 A | 3/1982 | Redding | |
| 4,445,389 A * | 5/1984 | Potzick | G01F 1/667 374/143 |
| 4,676,665 A | 6/1987 | Twerdochlib | |
| 4,754,650 A | 7/1988 | Smalling et al. | |
| 4,848,924 A | 7/1989 | Nuspl et al. | |
| 4,856,321 A | 8/1989 | Smalling et al. | |
| 4,955,004 A * | 9/1990 | Viscovich | F01K 13/003 367/137 |
| 5,115,670 A * | 5/1992 | Shen | G01F 1/66 73/61.41 |
| 5,168,699 A | 12/1992 | McCarty et al. | |
| 5,275,553 A | 1/1994 | Frish et al. | |
| 5,369,998 A * | 12/1994 | Sowerby | G01F 1/66 73/861.04 |
| 5,546,813 A * | 8/1996 | Hastings | G01F 1/662 374/E11.01 |
| 5,719,791 A | 2/1998 | Neumeier et al. | |
| 5,784,300 A | 7/1998 | Neumeier et al. | |
| 5,918,281 A * | 6/1999 | Nabulsi | G01F 1/10 73/597 |
| 6,142,665 A | 11/2000 | Haffner et al. | |
| 6,202,494 B1 * | 3/2001 | Riebel | G01F 1/662 73/861.29 |
| 6,386,755 B1 | 5/2002 | Draxton et al. | |
| 6,389,330 B1 | 5/2002 | Khesin | |
| 6,480,750 B2 | 11/2002 | Junk | |
| 6,487,916 B1 * | 12/2002 | Gomm | G01F 1/667 73/861.27 |
| 6,494,105 B1 * | 12/2002 | Gallagher | G01F 1/662 73/861.27 |
| 6,546,328 B1 | 4/2003 | Slicker | |
| 6,768,938 B2 | 7/2004 | McBrien et al. | |
| 6,850,836 B1 | 2/2005 | Scholl | |
| 6,952,639 B2 | 10/2005 | Kumar et al. | |
| 7,008,218 B2 | 3/2006 | Zhang et al. | |
| 7,013,210 B2 | 3/2006 | McBrien et al. | |
| 7,159,472 B1 | 1/2007 | Hastings et al. | |
| 7,191,073 B2 | 3/2007 | Astley et al. | |
| 7,202,794 B2 | 4/2007 | Huseynov et al. | |
| 7,278,266 B2 | 10/2007 | Taware et al. | |
| 7,380,470 B2 * | 6/2008 | Konzelmann | G01F 1/662 73/861.25 |
| 7,383,165 B2 | 6/2008 | Aragones | |
| 7,484,369 B2 | 2/2009 | Myhre | |
| 7,598,485 B2 | 10/2009 | Csutak | |
| 7,624,651 B2 * | 12/2009 | Fernald | G01F 1/7082 73/861.27 |
| 7,636,639 B2 * | 12/2009 | Metcalf | G01F 1/002 702/45 |
| 7,731,420 B2 | 6/2010 | Brummel et al. | |
| 7,752,918 B2 * | 7/2010 | Davis | G01F 1/667 73/861.18 |
| 7,761,216 B2 | 7/2010 | Norris et al. | |
| 7,795,783 B2 | 9/2010 | Trochesset et al. | |
| 7,853,433 B2 | 12/2010 | He et al. | |
| 8,001,761 B2 | 8/2011 | Myers, Jr. et al. | |
| 8,047,082 B2 * | 11/2011 | Bierl | G01F 1/66 73/861.04 |
| 8,146,408 B2 | 4/2012 | Snow | |
| 2004/0011141 A1 | 1/2004 | Lynnworth | |
| 2004/0194539 A1 * | 10/2004 | Gysling | G01F 1/667 73/61.45 |
| 2005/0011278 A1 * | 1/2005 | Brown | G01F 1/666 73/861.18 |
| 2005/0066744 A1 | 3/2005 | Kupnik et al. | |
| 2005/0132712 A1 | 6/2005 | Krok et al. | |
| 2005/0276306 A1 | 12/2005 | Mick et al. | |
| 2006/0137353 A1 | 6/2006 | Lieuwen et al. | |
| 2006/0248893 A1 | 11/2006 | Mick et al. | |
| 2007/0027607 A1 | 2/2007 | Norris et al. | |
| 2007/0062196 A1 | 3/2007 | Gleeson et al. | |
| 2007/0151363 A1 | 7/2007 | Ramsesh | |
| 2008/0010966 A1 | 1/2008 | Taware et al. | |
| 2008/0034753 A1 | 2/2008 | Furman et al. | |
| 2008/0208483 A1 | 8/2008 | Loose et al. | |
| 2009/0178490 A1 | 7/2009 | Konzelmann et al. | |
| 2009/0183573 A1 | 7/2009 | Fricke et al. | |
| 2009/0241506 A1 | 10/2009 | Nilsson | |
| 2010/0076698 A1 | 3/2010 | He et al. | |
| 2010/0132375 A1 | 6/2010 | Tanimura et al. | |
| 2010/0276225 A1 * | 11/2010 | Busse | B64D 33/06 181/198 |
| 2010/0288055 A1 * | 11/2010 | Mueller | G01F 1/66 73/861.28 |
| 2011/0154821 A1 | 6/2011 | Evans-Beauchamp | |
| 2012/0150413 A1 * | 6/2012 | Bunce | F02C 9/28 701/100 |
| 2012/0204620 A1 * | 8/2012 | Straub, Jr. | G01F 1/66 73/1.35 |
| 2014/0130606 A1 | 5/2014 | Schwarz | |
| 2014/0144156 A1 * | 5/2014 | Lang | G01K 11/24 60/793 |
| 2015/0063411 A1 * | 3/2015 | DeSilva | G01K 11/24 374/119 |
| 2015/0128723 A1 * | 5/2015 | Satou | G01F 1/662 73/861.28 |
| 2015/0168228 A1 * | 6/2015 | DeSilva | G01K 11/22 374/119 |
| 2015/0185089 A1 * | 7/2015 | DeSilva | G01K 11/24 73/112.01 |
| 2015/0260557 A1 * | 9/2015 | DeSilva | G01F 1/66 702/48 |
| 2015/0260611 A1 * | 9/2015 | DeSilva | G01M 15/14 73/112.01 |
| 2015/0260612 A1 * | 9/2015 | DeSilva | G01M 15/14 702/48 |

FOREIGN PATENT DOCUMENTS

| | | |
|---|---|---|
| EP | 1602904 A1 | 5/2005 |
| EP | 2290343 A2 | 3/2011 |
| JP | 2001141578 A | 5/2001 |
| JP | 2002156294 A | 5/2002 |
| WO | 93/04343 A1 | 3/1993 |
| WO | 9958942 A1 | 11/1999 |
| WO | 2015/164313 A1 | 10/2015 |
| WO | 2015/164466 A1 | 10/2015 |

OTHER PUBLICATIONS

"Temperature Measurement in a Gas Turbine Engine Combustor", filed on Mar. 14, 2013, U.S. Appl. No. 13/804,132.

"Active Measurement of Gas Flow Temperature, Including in Gas Turbine Combustors", filed on Mar. 13, 2014, U.S. Appl. No. 14/207,741.

"Multi Functional Sensor System for Gas Turbine Combustion Monitoring and Control" filed on Dec. 18, 2013, U.S. Appl. No. 14/109,992.

"Nonintrintrusive Performance Measurement of a Gas Turbine Engine in Real Time" filed concurrently herewith, related U.S. Appl. No. 14/341,950.

"Active Measurement of Gas Flow Velocity or Simultaneous Measurement of Velocity and Temperature, Including in Gas Turbine Combustors" filed on Mar. 13, 2014, U.S. Appl. No. 14/207,803: CIP parent application.

John A. Kleppe, Jim Maskaly and Gary Beam, "The Application of Image Processing to Acoustic Pyrometry," Proceedings, Int'l Conf. on Image Processing (IEEE) (1996).

(56) References Cited

OTHER PUBLICATIONS

G.Q. Shen, L.S.An, and G.S. Jiang, "Real-time Monitoring on Boiler Combustion Based on Acoustic Measurement", Power India Conference, (IEEE) (2006).

Helmut Sielschott and Willy Derichs, "Use of collocation methods under inclusion of a priori information in acoustic pyrometry", Process Tomography—95 Implementation for Industrial Processes, Proc. European Concerted Action on Process Tomography, Bergen, Norway, Apr. 6-8, 1995.

International Search Report for International Application No. PCT/US2015/027020 mailed Jul. 16, 2015, 4 pages.

Written Opinion for International Application No. PCT/US2015/027020 mailed Jul. 16, 2015, 7 pages.

International Search Report for International Application No. PCT/US2015/026784 mailed Jun. 29, 2015, 3 pages.

Written Opinion for International Application No. PCT/US2015/026784 mailed Jun. 29, 2015, 7 pages.

International Search Report for International Application No. PCT/US2015/020058 mailed Jun. 9, 2015, 4 pages.

Written Opinion for International Application No. PCT/US2015/020058 mailed Jun. 9, 2015, 8 pages.

Gustave C. Fralick; Acoustic Pyrometry Applied to Gas Turbines and Jet Engines; www.grc.nas.gov/WWW/RT/RT1998/5000/5510; 1998; 2 pages.

Gustave C. Fralick; Passive Acoustic Tomography Tested for Measuring Gas Temperatures; Research and Technology 2003; May 2004; NASA Glenn Research Center, Cleveland, OH.

Upul Desilva et al.; Novel Gas Turbine Exhaust Temperature Measurement System; Proceedings of the ASME Turbo Expo 2013; GT2013-95153; Jun. 3-7, 2013; 8 pages.

Wiens T. et al.; Turbulent flow sensing using acoustic tomography; Inter Noise 2009; innovations in practical noise control; Aug. 23-26, 2009, Ottawa, CA.

Olley P. et al.; The Development of Acoustic Tomography for Temperature Measurement in Fast Reactors; for presentation at the IAEA/IWGFR Specialist Meeting on Instrumentation for the Supervision of Core Cooling in LMFBR's at Kalpakkam, India: Dec. 12-15, 1989.

\* cited by examiner

NONINTRUSIVE TRANSCEIVER AND METHOD FOR CHARACTERIZING TEMPERATURE AND VELOCITY FIELDS IN A GAS TURBINE COMBUSTOR

CROSS-REFERENCE TO RELATED APPLICATIONS

This application is a continuation in part of copending United States patent application entitled "Active Measurement of Gas Flow Velocity or Simultaneous Measurement of Velocity and Temperature, Including in Gas Turbine Combustors", filed on Mar. 13, 2014, Ser. No. 14/207,803, US Patent Publication No. 2015/0168190, U.S. Pat. No. 9,556,791.

This application incorporates by reference the following co-pending United States utility patent applications in their entirety as if fully set forth herein:

"Nonintrusive Performance Measurement of a Gas Turbine Engine in Real Time", Ser. No. 14/341,950, filed concurrently herewith, US Patent Publication No. 2015/0260557;

"Active Measurement of Gas Flow Temperature, Including in Gas Turbine Combustors", filed on Mar. 13, 2014, Ser. No. 14/207,741, US Patent Publication No. 2015/0168230;

"Active Temperature Monitoring in Gas Turbine Combustors", filed on Dec. 18, 2013, Ser. No. 14/132,001, US Patent Publication No. 2015/0168229, U.S. Pat. No. 9,453,767;

"Multi-Functional Sensor System for Gas Turbine Combustion Monitoring and Control" filed on Dec. 18, 2013, Ser. No. 14/109,992, US Patent Publication No. 2015/0168228, U.S. Pat. No. 9,568,378;

"Temperature Measurement In A Gas Turbine Engine Combustor", filed on Mar. 14, 2013, Ser. No. 13/804,132, US Patent Publication No. 2014/0278200; and "Gas Turbine Engine Control Using Acoustic Pyrometry", filed on Dec. 14, 2010, Ser. No. 12/967,148, US Patent Publication No. 2012/0150413, U.S. Pat. No. 8,565,999.

This application also incorporates by reference in its entirety as if fully set forth herein U.S. Pat. No. 7,853,433, "Combustion Anomaly Detection Via Wavelet Analysis Of Dynamic Sensor Signals", issued Dec. 14, 2010.

STATEMENT REGARDING FEDERALLY SPONSORED RESEARCH OR DEVELOPMENT

Temperature mapping portions of this invention were made with government support under contract DE-FC26-05NT42644 awarded by the U.S. Department of Energy. The government may have certain rights in the invention.

BACKGROUND OF THE INVENTION

1. Field of the Invention

The invention relates to active measurement of gas flow temperature or velocity, or simultaneous measurement of velocity and temperature, such as combustion gas flow in combustors of gas turbine engines. Such engines include, by way of example, industrial gas turbine (IGT) engines, other types of stationary gas turbine, marine, aero and other vehicular gas turbine engines. More particularly, embodiments of temperature, velocity or simultaneous velocity/temperature measurement methods and apparatus disclosed herein utilize a sensing and control system for combustor velocity and temperature determination, including acoustic transceivers. In embodiments disclosed herein an improved acoustic transceiver is suited for withstanding conditions associated with the combustors of gas turbine engines. Gas flow velocity and temperature data are used for engine combustion monitoring, control and performance evaluation.

2. Description of the Prior Art

Combustion turbines, such as gas turbine engines for any end use application, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

Combustion anomalies, such as flame flashback, have been known to occur in combustion sections of gas turbine engines. Flame flashback is a localized phenomenon that may be caused when a turbulent burning velocity of the air and fuel mixture exceeds an axial flow velocity in the combustor assembly, thus causing a flame to anchor onto one or more components in/around the combustor assembly, such as a liner disposed around the combustion chamber. The anchored flame may burn through the components if a flashback condition remains for extended periods of time without correction thereof. Thus, flame flashback and/or other combustion anomalies may cause undesirable damage and possibly even destruction of combustion engine components, such that repair or replacement of such components may become necessary.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine. In other known types of control arrangements discrete pitot-static or multi hole pressure probes are utilized to determine gas flow velocity at specific locations, but grid arrays of such probes disrupt gas flow and introduce measurement errors. Due to such gas flow disruptions, grid arrays, when employed, have limited numbers of widely spaced probes, which provide relatively coarse gas flow velocity distribution and profile information.

At present, there are several different types of sensors and sensing systems that are being used in the industry for monitoring combustion and maintaining stability of the combustion process for engine protection. For example, dynamic pressure sensors are being used for combustion stability and resonance control. Passive visual (optical visible light and/or infrared spectrum) sensors, ion sensors and Geiger Mueller detectors are used to detect flame on/off in the combustor, while thermocouples are being used for flashback detection. With respect to known combustion gas flow velocity (u) monitoring methods, pitot-static and multi hole pressure probes utilize differential pressure techniques, hot wire probes utilize thermal anemometry techniques, while Laser Doppler and Particle Image Velocimetry systems utilize optical techniques to characterize gas flow velocities. Differential pressure and thermal anemometry instruments are intrusive point measurement devices that disturb local gas flow around the instruments. Laser Doppler and Particle Image Velocimetry instruments respectively provide non-intrusive point and 2- or 3-dimensional non-intrusive gas flow velocity measurement although they both require particle seeding of the flow. In addition, sophisticated laser based measurements such as Filtered Rayleigh Scattering (FRS) and other such laser spectroscopy based techniques have been deployed to measure gas velocity. However, these techniques are more complex than intrusive differential pressure or thermal anemometry instruments and require more specialized training to implement in monitoring systems. Moreover, most optical techniques for velocity are geared towards laboratory environments rather than in operative engines at power plant field sites. With respect to temperature (T) monitoring techniques, known Raman Spectroscopy, Laser Induced Fluorescence (for both u and T monitoring), and Coherent Anti-Stokes Raman Spectroscopy (CARS) (for both u and T monitoring) instrumentation systems are also intended for laboratory environments, rather than for field use in fossil power generation equipment. Tunable Diode Laser Absorption Spectroscopy (TDLAS) instrumentation is used in some industrial power generation field applications, such as for temperature measurement in boilers but that instrumentation is extremely costly: approximately US $500,000 per system. Other types of temperature measurement and combustion anomaly detection systems have had greater acceptance in power generation industry field applications.

Particularly, U.S. Pat. No. 7,853,433 detects and classifies combustion anomalies by sampling and subsequent wavelet analysis of combustor thermoacoustic oscillations representative of combustion conditions with sensors, such as dynamic pressure sensors, accelerometers, high temperature microphones, optical sensors and/or ionic sensors. United States Publication No. US2012/0150413 utilizes acoustic pyrometry in an IGT exhaust system to determine upstream bulk temperature within one or more of the engine's combustors. Acoustic signals are transmitted from acoustic transmitters and are received by a plurality of acoustic receivers. Each acoustic signal defines a distinct line-of-sound path between a corresponding transmitter and receiver pair. Transmitted signal time-of-flight is determined and processed to determine a path temperature. Multiple path temperatures can be combined and processed to determine bulk temperature at the measurement site. The determined path or bulk temperature or both can be utilized to correlate upstream temperature in the combustor. Co-pending U.S. utility patent application Ser. No. 13/804,132 calculates bulk temperature within a combustor, using a so-called dominant mode approach, by identifying an acoustic frequency at a first location in the engine upstream from the turbine (such as in the combustor) and using the frequency for determining a first bulk temperature value that is directly proportional to the acoustic frequency and a calculated constant value. A calibration second temperature of the working gas is determined in a second location in the engine, such as the engine exhaust. A back calculation is performed with the calibration second temperature to determine a temperature value for the working gas at the first location. The first temperature value is compared to the back calculated temperature value to change the calculated constant value to a recalculated constant value. Subsequent first temperature values at the combustor may be determined based on the recalculated constant value.

Thus, different adverse conditions related to combustion gas flow temperature, anomalies and velocity currently require separate sensor designs and/or separate sensing systems to detect those conditions. Known combined IGT and other types of gas turbine engine monitoring and control system sensor and detection approaches have not covered all possible adverse combustion fault detections. Installation of different types of disparate sensors and sensing systems in a single combustion turbine engine increases installation cost and maintenance expense. Also, the disparate sensors and sensing systems inherently introduce response lags and delays in the overall engine control system.

Thus, a need exists in the art for an integrated gas turbine engine monitoring and control system for measuring gas flow velocity, temperature and detecting a broad range of possible combustor failures or, more satisfactorily precursors to faults, during combustion, sharing common sensors and, if desired, a common controller.

Another need exists in the art for a gas turbine engine active velocity and temperature monitoring system that determines actual combustor temperature in real time without the need to obtain reference temperatures from other locations within the engine, such as known bulk temperature systems that back calculate combustor temperature based on temperature measurements obtained in the engine exhaust system.

An additional need exists for an active gas flow velocity and temperature monitoring system that shares sensors commonly used with combustion turbine monitoring and control systems, so that active velocity and temperature monitoring can be integrated within the monitoring and control system.

Another need exists for an acoustic transceiver and method for transmitting and sensing acoustic signals within a turbine engine combustor gas flow, under the adverse temperature conditions that exist in a gas turbine engine combustor.

A further need exists for a modular transceiver arrangement for transmitting and sensing acoustic signals within a turbine engine combustor gas flow wherein the transmitter and receiver are conveniently mounted together on the turbine combustor.

Another need exists for an acoustic transceiver in which an acoustic receiver is positioned to accurately receive a signature of a signal transmitted by a transmitter in the same transceiver for use as a reference for identifying and timing the signal.

SUMMARY OF THE INVENTION

An object of embodiments of the invention is the active measurement of gas flow temperature and velocity within a turbine engine combustor.

Another object of embodiments of the invention is provision of an acoustic transceiver for use in monitoring gas flow velocity and temperature in a turbine engine combustor while surviving the adverse conditions associated with the combustor.

Another object of embodiments of the invention is creation of an integrated gas turbine monitoring and control system for detecting a broad range of possible combustor failures or, more satisfactorily, precursors to faults, during combustion, by directly and actively monitoring conditions within the combustor.

Another object of embodiments of the invention is the active measurement of temperature, velocity or both temperature and velocity of a volume of gas within a gas turbine combustor without disturbing or distorting the measured gas field.

These and other objects are achieved in one or more embodiments of the invention by active acoustic velocity and pyrometry-based gas flow velocity and temperature measurement transceivers, systems and methods described herein. Embodiments of the velocity or velocity/temperature monitoring systems and methods are used for monitoring combustion gas within gas turbine combustors, including industrial gas turbine (IGT) combustors. These velocity or velocity/temperature monitoring systems and methods are incorporated into the turbine combustion monitoring and control system by addition of robust transceivers capable of surviving environmental conditions presented by the gas turbine combustors. Each robust transceiver transmits sound waves within the combustor flow field in a line-of-sound with at least one other robust transceiver. For velocity measurement, sound transmission time-of-flight that is directed generally transverse to the gas flow path is measured by the controller and correlated with gas flow velocity along the line-of-sight. Similarly, sound transmission time-of-flight is correlated with temperature along the line-of-sight. Path(s) of acoustic transmission serve as paths for velocity or velocity/absolute temperature measurement. In an integrated acoustic pressure-based sensor and monitoring/control system embodiment, the controller correlates velocity and, if desired, absolute active path temperatures with acoustic transmission and time-of-flight analysis techniques. In this way a combustion monitoring and control system that incorporates embodiments of the invention can identify and classify combustion anomalies and actively control the gas turbine combustion process within the engine combustors.

In some embodiments, a transceiver is provided for measuring acoustic properties of a gas under the adverse conditions associated with a gas turbine engine combustor. The transceiver includes a measurement chamber in communication with the combustion chamber through an opening that allows acoustic signals to propagate from the combustion chamber to the measurement chamber. Conditions in the measurement chamber are less adverse to acoustic sensor equipment and acoustic transmission equipment than the conditions within the combustion chamber. The transceiver includes a housing that defines a measurement chamber and has at least a first opening. The housing is adapted to be attached to a turbine engine combustor wall of the turbine engine combustor. Acoustic signals are permitted to propagate between the gas in the turbine engine combustor and gas in the measurement chamber through the first opening. The transceiver also includes an acoustic sensor mounted to the housing for receiving the acoustic signals propagating in the measurement chamber. The transceiver further includes an acoustic transmitter mounted to the housing for creating acoustic signals within the measurement chamber.

In further embodiments, the acoustic sensor of the transceiver is in communication with the measurement chamber through a second opening in the housing. The housing may be a substantially cylindrical housing having first and second ends, in which case the first opening is at the first end of the housing, the acoustic transmitter is at the second end of the housing and the second opening is in a wall of the housing between the first and second ends.

In another embodiment, the measurement chamber comprises a wave guide between the first opening and the second opening. The wave guide has a first cross sectional area near the first opening that is substantially larger than a second cross sectional area near the second opening. The wave guide may be substantially horn-shaped.

In optional embodiments, the acoustic transmitter is a spark generator comprising a spark gap within the measurement chamber and an electrical energy source connected to the spark gap. A step-up transformer may be provided in proximity to the spark gap to step up a voltage of the electrical energy source. An acoustic signal of the spark generator may contain at least 60% content having a frequency of over 20 kHz. The acoustic transmitter may alternatively be a whistle acoustic signal source. The whistle acoustic signal source may be activated by a cooling gas flow outside the turbine engine combustor. The whistle may be separated from the measurement chamber by a membrane that prevents flow from the measurement chamber and conducts acoustic signals from the whistle acoustic signal source to the measurement chamber. An acoustic signal emitted by the whistle acoustic signal source may have a dominant frequency within 2-5 kHz.

In further embodiments, the acoustic sensor may be a piezoelectric microphone, or a piezoresistive microphone, or a fiber optic microphone.

Embodiments of the invention are also directed to a system for measuring properties of a gas in a turbine engine combustor. The system includes a first housing mounted to the turbine engine combustor and defining a first measurement chamber in communication with an interior of the turbine engine combustor through a first opening in a wall of the turbine engine combustor. The first opening permits propagation of acoustic signals between the gas in the turbine engine combustor and gas in the first measurement chamber. A first acoustic sensor is mounted to the first housing for receiving acoustic signals propagating in the first measurement chamber, and a first acoustic transmitter is mounted to the first housing for creating acoustic signals within the first measurement chamber. A controller is coupled to the first acoustic sensor and the first acoustic transmitter, and is additionally coupled to a second acoustic sensor arranged to receive acoustic signals propagating in the gas in the turbine engine combustor. The controller is further coupled to a second acoustic transmitter for creating acoustic signals in the gas in the turbine engine combustor. The controller includes a processor and computer readable media containing computer readable instructions that, when executed by the processor, cause the processor to perform the following operations directed to measuring properties of the gas in the turbine engine combustor. The first acoustic transmitter transmits a first acoustic signal, and the second acoustic sensor receives a signal including contributions from the first acoustic signal. The second acoustic transmitter transmits a second acoustic signal, and the first acoustic sensor receives a signal including contributions from the second acoustic signal. The processor then determines times of flight for the first and second acoustic signals, including propagation times along lines of sound within the turbine engine combustor. The processor then processes the times of flight to determine the properties of the gas in the turbine engine combustor.

Additional embodiments of the system include a second housing mounted to the turbine engine combustor and defining a second measurement chamber in communication with the interior of the turbine engine combustor through a second opening in the wall of the turbine engine combustor. The second opening permits propagation of acoustic signals between the gas in the turbine engine combustor and gas in the second measurement chamber. The first and second openings define a line-of-sound path through the turbine engine combustor. The second acoustic sensor is mounted to the second housing for receiving acoustic signals propagating in the second measurement chamber. The measured gas properties in the turbine engine combustor may include an average speed of sound along the line-of-sound path. In that case, the processor may determine an average temperature of the gas in the turbine engine combustor along the line-of-sound path based on the speed of sound along the line-of-sound path. The measured gas properties in the turbine engine combustor may include an absolute gas flow velocity along the line-of-sound path. In that case, the processor may determine an average temperature of the gas in the turbine engine combustor along the line-of-sound path based on the speed of sound along the line-of-sound path; and then determine the absolute gas flow velocity along the line-of-sound path based on the speed of sound along the line-of-sound path and further based on the temperature of the gas along the line-of-sound path. The first and second openings may be located in separate axial planes in a combustion zone of the turbine engine combustor containing a flame, or alternatively in an exit zone of the turbine engine combustor proximate a turbine inlet.

Other embodiments are directed to a method for actively monitoring gas flow characteristics in a turbine engine combustor. A first acoustic transmitter transmits first acoustic signals in a first measurement chamber. The first measurement chamber is in communication with an interior of the turbine engine combustor through a first opening to permit propagation of the first acoustic signals from the first measurement chamber to the interior of the turbine engine combustor. A first acoustic sensor then receives the first acoustic signals in a second measurement chamber. The second measurement chamber is in communication with the interior of the turbine engine combustor through a second opening to permit propagation of the first acoustic signals from the interior of the turbine engine combustor to the second measurement chamber. A time-of-flight is then determined for the first acoustic signals along a fixed line-of-sound path in the turbine engine combustor from the first opening to the second opening. The time-of-flight is processed to determine the gas flow characteristics in the turbine engine combustor.

In additional embodiments, processing the time-of-flight to determine the gas flow characteristics further comprises processing the time-of-flight to determine an average speed of sound along the fixed line-of-sound path. A temperature along the fixed line-of-sound path may be determined based on the average speed of sound. Processing the time-of-flight to determine the gas flow characteristics may further include processing the time-of-flight to determine an average flow velocity along the fixed line-of-sound path The respective objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
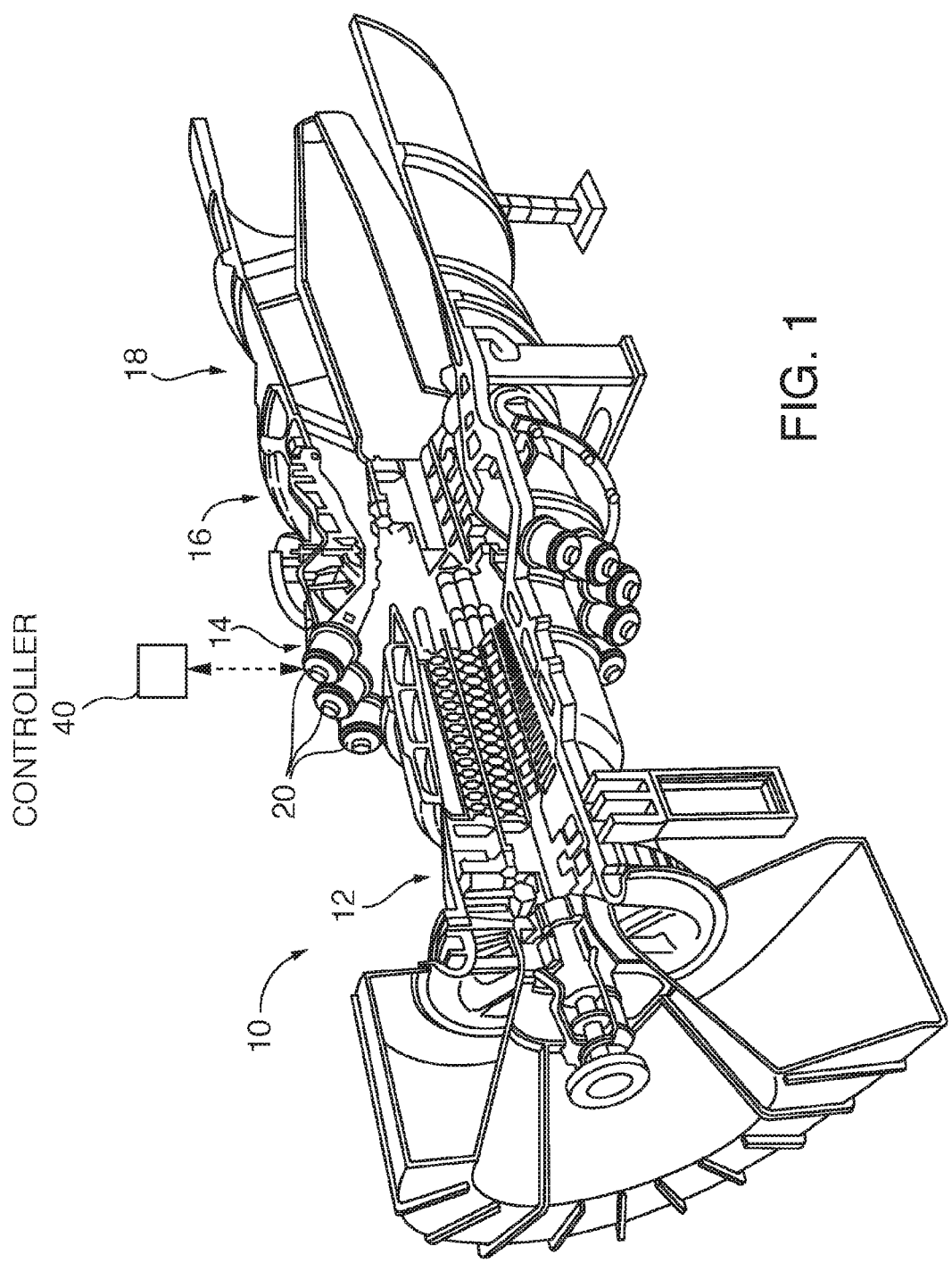
FIG. 1 is a perspective cross-sectional view of a gas turbine engine illustrating implementation of a system for determining combustor gas flow active velocity and temperature measurement, in accordance with embodiments of the invention.

After considering the following description, those skilled in the art will clearly realize that the teachings of the invention can be readily utilized for active acoustic velocity and pyrometry-based gas flow velocity and temperature measurement. Embodiments of the invention are used for monitoring of gas turbine combustors, including industrial gas turbine (IGT) combustors by incorporating them into the combustion monitoring and control system by addition of an acoustic transmitter or acoustic transceiver that transmits sound waves through gas flow in a line-of-sight with a plurality of acoustic sensors, such as dynamic pressure sensors. For velocity measurement, sound transmission time-of-flight that is directed generally transversely through the gas flow path is measured by the controller and correlated with gas flow velocity along the line-of-sight. The gas flow velocity determination includes compensation for impact of the thermodynamically interrelated temperature, gas constant and speed of sound influences on the first time-of-flight, in order to determine absolute gas flow velocity.

In an integrated acoustic pressure-based sensor and monitoring/control system embodiment, the controller correlates velocity and, if desired, absolute active path temperatures simultaneously with acoustic transmission and time-of-flight analysis techniques. Where velocity and temperature are measured simultaneously the absolute active path temperature is utilized to compensate for the aforementioned thermodynamic influences on gas flow absolute velocity. Alternatively in other embodiments the speed of sound influence on the first time-of-flight is utilized to determine absolute gas flow velocity rather than absolute active path temperature. In such embodiments, compensation for the speed of sound in the velocity monitoring is accomplished by substituting for the first transmitters a set of first transceiver/transducers that are capable of transmitting and receiving acoustic signals, and generating output signals and substituting for the first sensors a set of second transducers that are capable of transmitting and receiving acoustic signals and generating output signals. Acoustic signals are transmitted and received from the first to the second transducers and time-of-flight is determined. A reverse acoustic signal is transmitted from the second to the first transducers and the reverse time-of-flight is determined. The respective first and first reversed acoustic signals times-of-flight are used to determine the speed of sound c. The determined speed of sound c is then utilized for determination of the actual gas flow velocity.

In embodiments of the invention active velocity or active velocity/temperature measurements are used as monitoring parameters for gas flow in a combustion monitoring and control system that can identify and classify gas flow anomalies (e.g., combustion anomalies), for example by using wavelet or Fourier analysis techniques. Some embodiments of the methods and system incorporate one or more acoustic dynamic pressure transceiver/transducer combination transmitter/sensors that are selectively oriented or arrayed in sequential axial planar positions within the combustor. Known transceiver/transducer component designs and their related controller components have been used reliably and cost effectively in the past in power generation field service. By reconfiguring those types of known components into the gas flow control and monitoring systems of the present invention combustion turbine and other combustion power generation equipment can be monitored and controlled with simpler instrumentation hardware configurations that provide detailed active gas flow velocity and temperature distribution information useful for precise combustion control.

Monitoring and Control System Structure

Figure 2:
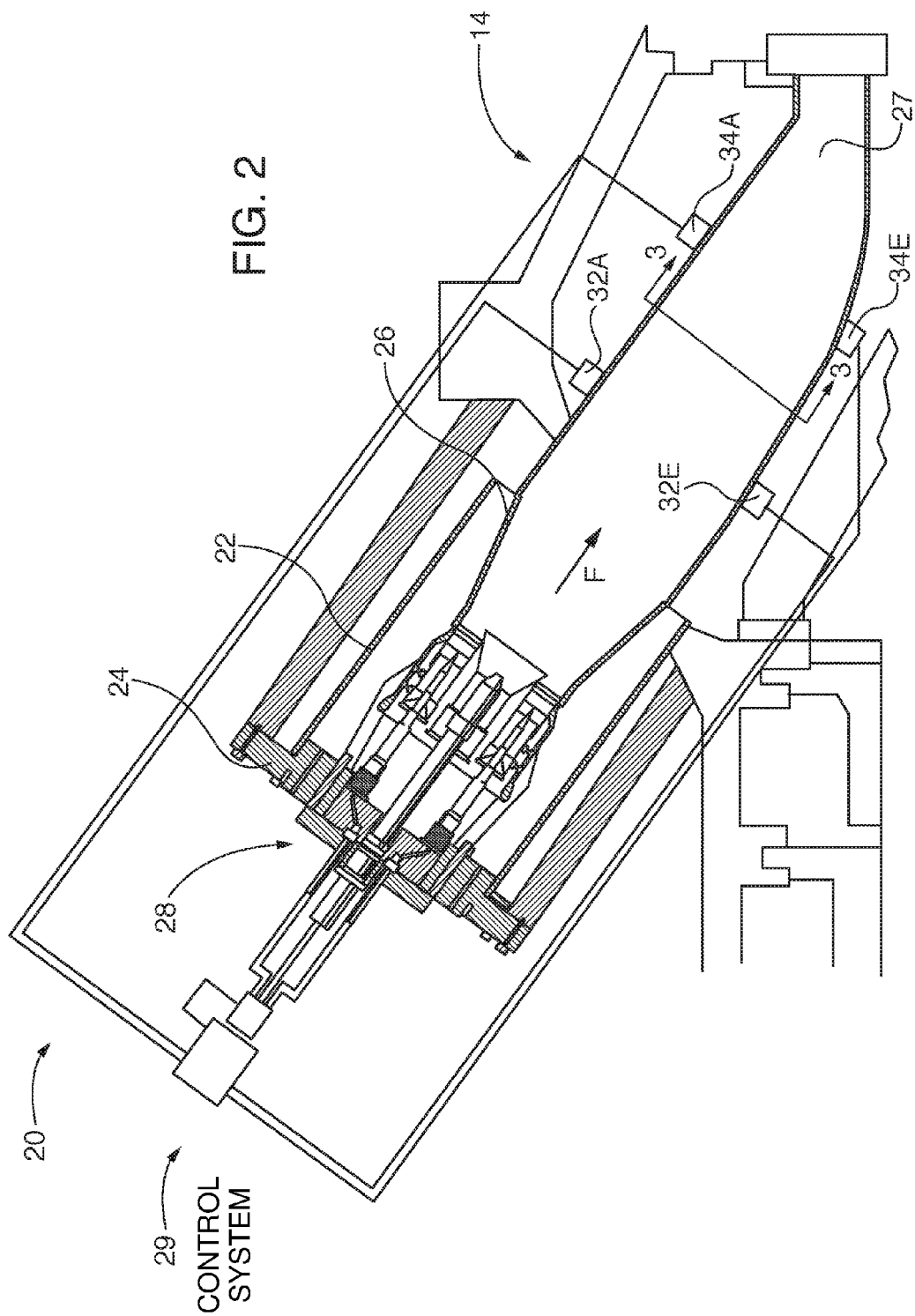
FIG. 2 is a cross-sectional view of a gas turbine combustor incorporating an embodiment of a monitoring system for determining combustor gas flow active velocity and temperature measurement, in accordance with embodiments of the invention.

Referring to FIGS. 1 and 2 an exemplary industrial gas turbine engine 10 is shown. The exemplary engine 10 includes a compressor section 12, a combustor section 14, a turbine section 16, and an exhaust section or system 18. The combustor section 14 includes a plurality of combustors 20. Each combustor 20 has a combustion shell 22 and a cover plate 24. The combustor liner or basket 26 and transition duct 27 define a passage for conveying hot working gas that flows in the direction F to the turbine section 16. The system of the present invention is operable with known combustor geometry gas turbine engine designs, including can, can-annular or annular construction combustors in stationary land-based or vehicular applications.

During operation of the engine 10, compressed air from the compressor section 12 is provided to the combustor section 14 where it is combined with fuel supplied by fuel injection system 28 in the combustors 14. The fuel/air mixture is ignited to form combustion products comprising the hot working gas. It may be understood that combustion of the fuel and air may occur at various axial locations along the passage through the combustor liner or basket 26 and the transition duct 27 to the inlet of the turbine section 16. The hot working gas is expanded through the turbine section 16 and is exhausted through the exhaust section/system 18.

Referring to FIGS. 1 and 2, in accordance with an aspect of the invention, a combustion monitoring and control system 29 is provided, which can identify and classify combustion anomalies and actively control the gas turbine combustion process within one or more of the engine 10 combustors 20. In this regard, the engine 10 may include may comprise one or more of the monitoring and control system(s) 29: e.g., one system 29 for each combustor 20, or a single system 29 may service each combustor 14 of the engine 10. Similarly, clusters of combustors 20 may be served by one system 29, with other cluster(s) being served by other systems. Thus the consolidated monitoring system for an engine 10 can determine deviations between respective combustors and compare their relative performance no matter what engine combustor structure or orientation is employed by the engine design: whether a stationary, land-based turbine engine or a vehicular engine for aero, marine or land vehicular applications.

Figure 5:
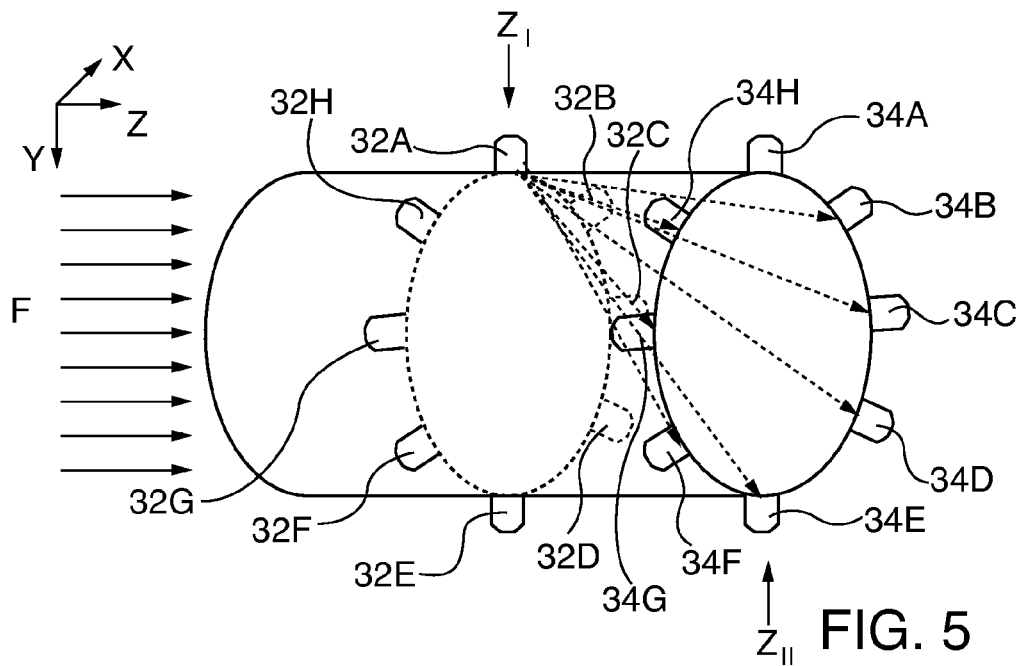
FIG. 5 is a schematic perspective view of exemplary sonic sensor arrays used by the gas flow monitoring system to measure gas flow velocity in a gas turbine combustor, in accordance with embodiments of the invention.
Figure 9:
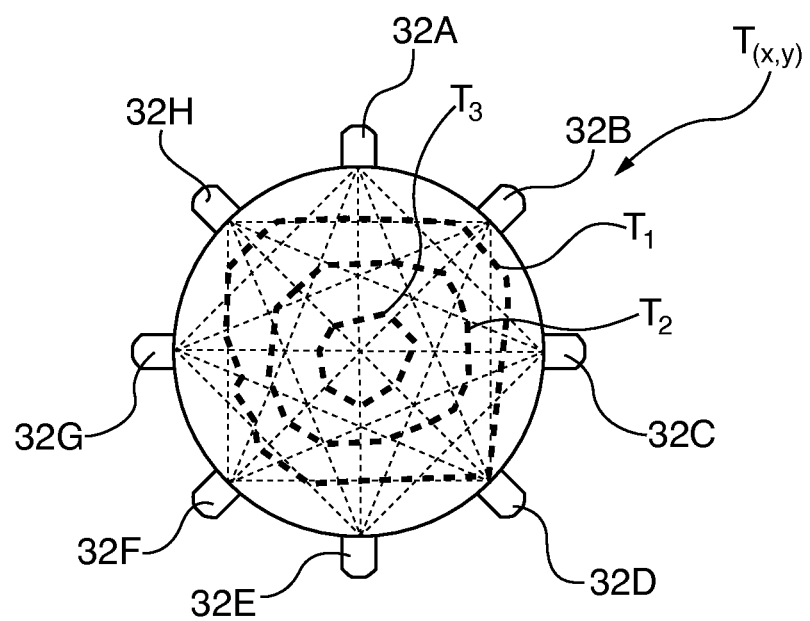
FIG. 9 is a schematic perspective view of exemplary sonic sensor arrays used to measure gas flow temperature in a gas turbine combustor, in accordance with embodiments of the invention.

As shown in FIGS. 2, 3, 5 and 9 the system 29 includes an array of a plurality of known acoustic transceiver/transducers 32A-H and 34A-H that are capable of transmitting and receiving acoustic oscillation waves along exemplary the line-of-sight paths shown in dashed lines in FIGS. 5 and 9. The transceiver/transducer arrays 32, 34 are capable of generating respective sensor output signals indicative of combustion thermoacoustic oscillations in each respective monitored and controlled combustor 20. Other system embodiments can be constructed with at least two, but preferably more acoustic sensors, whether functionally part of a transceiver component or as a stand-alone component. Acoustic frequencies and amplitudes sensed by those acoustic sensor portions of the transceivers are generated as a result of combustion events in the working combustion gas, defining acoustic sources that occur within the combustor 20 hot gas path. The monitoring and control system 29 is configured to transform the sensed thermoacoustic oscillation information into a form that enables the occurrence of combustion anomalies of interest to be discerned. As such, flame flashback events and other types of combustion anomalies of interest may be detected and extracted from sensed thermoacoustic oscillations in the combustor 14 that are monitored by the transceiver/transducer/sensors positioned in and/or around the combustor 14. Depending upon the system 29 configurations and application, the acoustic sensors comprise any combination of one or more of a dynamic pressure sensor, a microphone, an optical sensor or an ionic turbine inlet sensor. Pressure sensors sense the amplitudes of thermoacoustic oscillations in the combustor 20 as well as pulsation frequencies. A high temperature microphone may be utilized to measure acoustic fluctuations in the combustor 14. An optical sensor may be utilized to measure a dynamic optical signal within the combustor 20. An ionic sensor may be utilized to measure dynamic ionic activity within the combustor 20.

Figure 3:
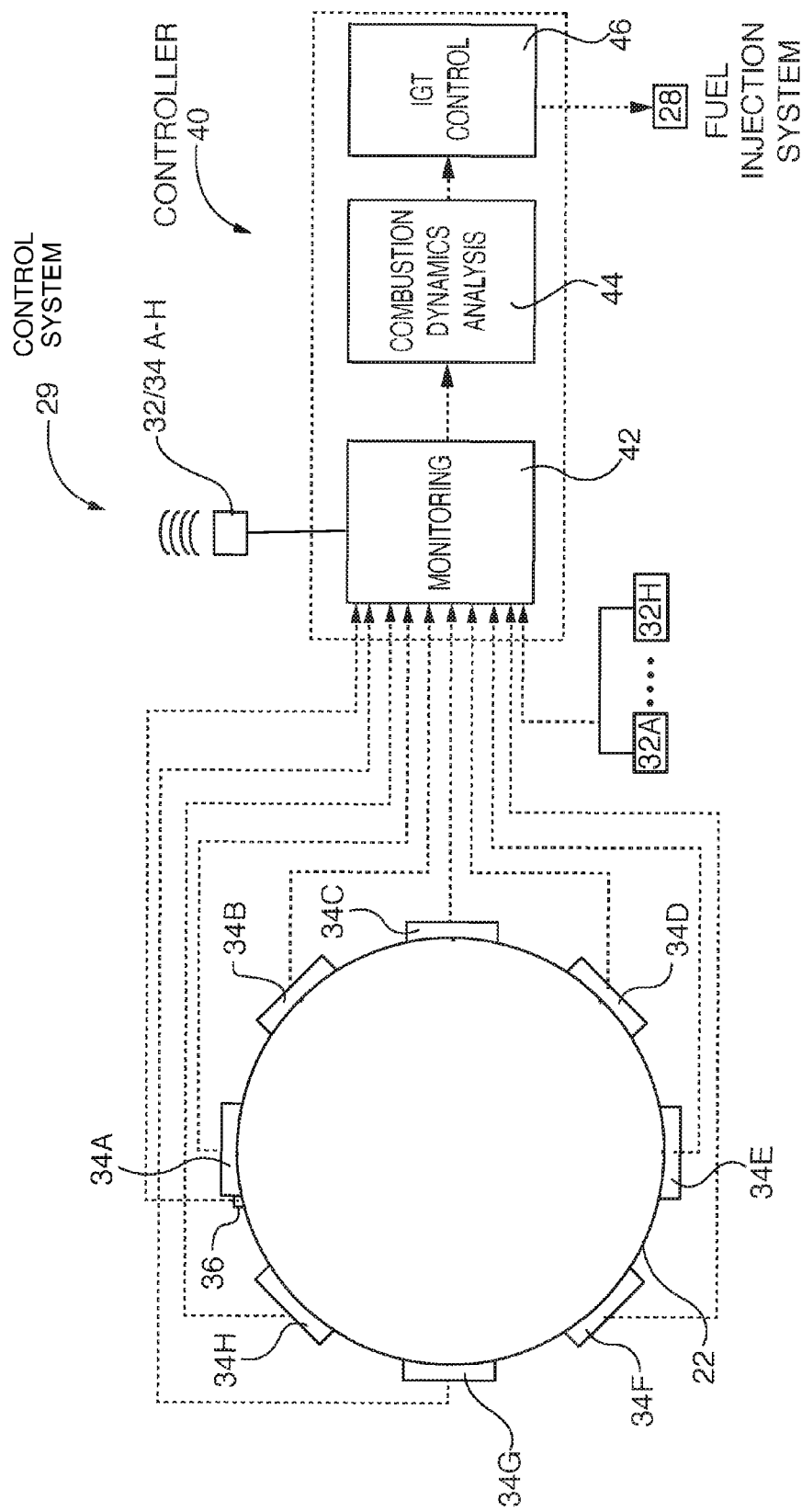
FIG. 3 is a cross-sectional view of the system of FIG. 2, taken along 3-3 thereof, in accordance with aspects of the invention.

An exemplary acoustic sensor array shown schematically in FIGS. 2, 3, 5 and 9 comprises transceiver/transducers 32A-H and 34A-H that function as at least one acoustic transmitter that transmits in turn to at least one and preferably a plurality of the dynamic pressure sensors in the array. The transceiver/transducers 32, 34 are arrayed axially and radially within the combustor 20 by known mounting structures and methods, such as J tubes or rakes, within the combustor shell 22 proximal the combustor basket or liner 26, and/or proximal the transition 27 junction with the turbine section 16. In FIG. 3 the sensors are radially/circumferentially arrayed transceivers 34A-34H that are capable of transmitting and receiving acoustic oscillation waves along the line-of-sight paths similar to the transceivers 32A-H shown in dashed lines in FIG. 9. Other types of known sensors, such as individual thermocouple temperature sensors or thermocouple arrays may be employed within the gas turbine engine. For example in FIG. 3 thermocouple 36 measures combustion temperature in the combustor 20. While exemplary three-dimensional annular combustion flow paths and axially spaced, two-dimensional circular-annular transceiver/transducer arrays are shown in the figures, other combustion flow path and array orientations may be utilized, in practicing embodiments of the invention, including square- or rectangular-shaped geometries.

Figure 4:
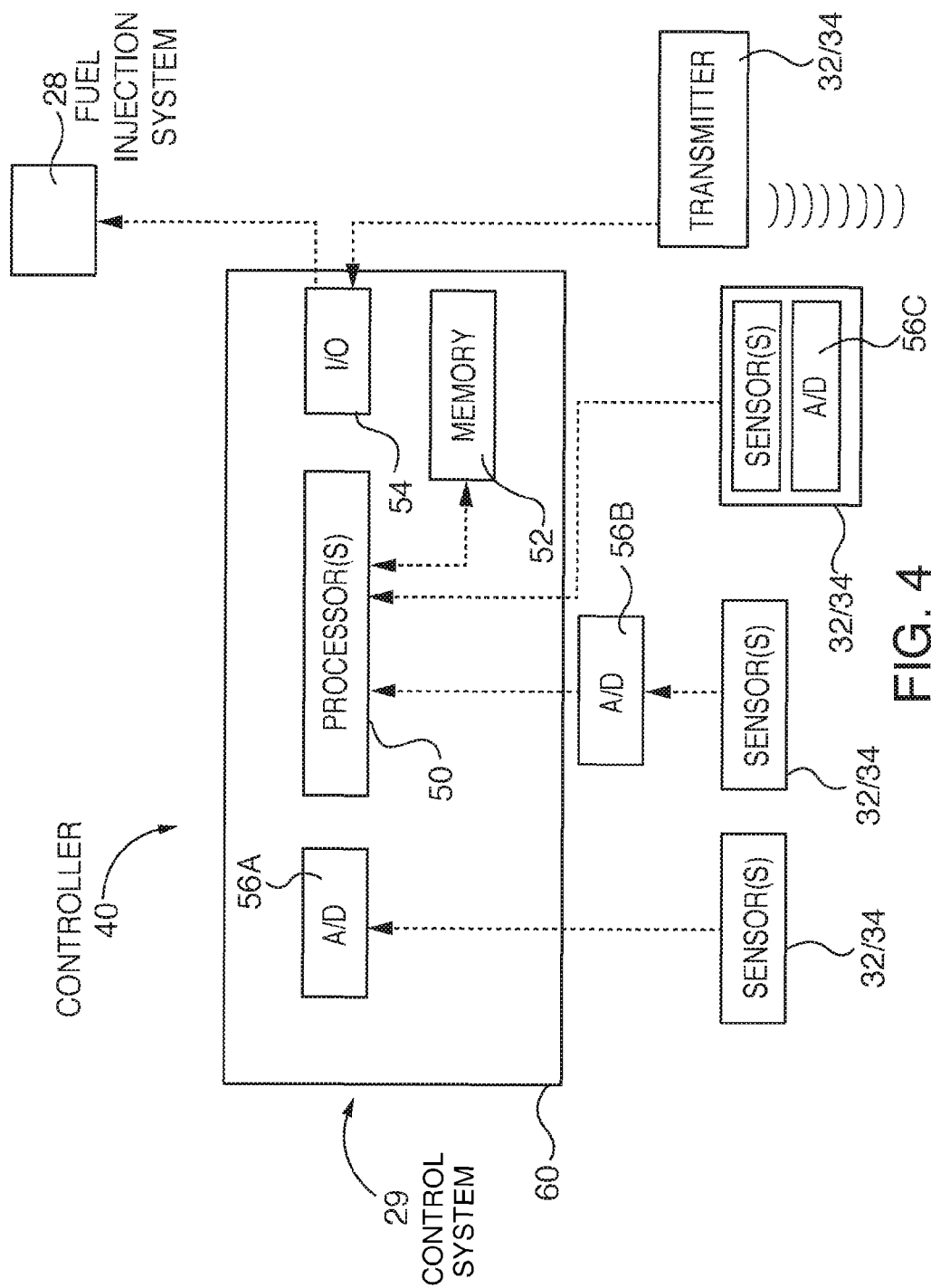
FIG. 4 is a block diagram of an embodiment of a controller for implementing embodiments of the present invention in the monitoring system for determining combustor gas flow active velocity and temperature measurement, in accordance with embodiments of the invention.

As shown in greater detail in FIGS. 3 and 4, the monitoring and control system 29 comprises a known controller 40, coupled to the transceiver/transducers 32, 34, that is capable of correlating sensor output signals with gas flow velocity and combustion temperature in a monitoring section 42 and conducting combustion dynamics analysis of the combustion process in an analysis section 44. The monitoring section 42 and dynamic analysis 44 section outputs are utilized by the gas turbine control system 46 that can send control signals to other gas turbine controls subsystems, including industrial gas turbine (IGT) controls subsystems, such as the fuel injection system 28, in order to unload or shut down the engine 10 in response to changes in monitored combustion conditions within the combustor 20.

Referring to the exemplary controller 40 embodiment shown in FIG. 4, it includes one or more processors 50, system memory 52 and input/output control devices 54 for interfacing with the associated engine 10 controls, such as the fuel injection control system 28, and the acoustic transceiver/transducer 32, 34 acoustic transmitters and sensors 32 (or functionally equivalent performing separate discrete transmitters and receiver sensors), networks, other computing devices, human machine interfaces for operator/users, etc. The controller 40 may also include one or more analog to digital converters 56A and/or other components necessary to allow the controller 40 to interface with the transceivers 32, 34 and/or other system components to receive analog sensor information. Alternatively, and/or additionally, the system 29 may include one or more analog to digital converters 56B that interface between the transceivers 32, 34 (or functionally equivalent performing separate discrete transmitters and receiver sensors) and the controller 40. As yet a further example, certain transceivers 32, 34 may have an analog to digital converter 56C integral therewith, or are otherwise able to communicate digital representations of sensed information directly to the controller 40.

The processor(s) 50 may include one or more processing devices such as a general purpose computer, microcomputer or microcontroller. The processors 50 may also comprise one or more processing devices such as a central processing unit, dedicated digital signal processor (DSP), programmable and/or reprogrammable technology and/or specialized component, such as application specific integrated circuit (ASIC), programmable gate array (e.g., PGA, FPGA).

The memory 52 may include areas for storing computer program code executable by the processor(s) 50, and areas for storing data utilized for processing, e.g., memory areas for computing wavelet transforms, Fourier transforms or other executed mathematical operations used to operate the monitoring and control system 29, as described more fully herein below. As such, various aspects of the present invention may be implemented as a computer program product having code configured to perform the detection of combustion engine anomalies of interest, combustion dynamics and engine control functions as set out in greater detail herein.

In this regard, the processor(s) 50 and/or memory 52 are programmed with sufficient code, variables, configuration files, etc., to enable the controller 40 to perform its designated monitoring and control functions. For example, the controller 40 may be operatively configured to sense thermoacoustic conditions, analyze thermoacoustic conditions based upon inputs from one or more transceiver/transducers 32, 34, control features of the engine 10 in response to its analysis, and/or report results of its analysis to operators, users, other computer processes, etc. as set out in greater detail herein. Thus, all of the dynamic output signals originating from transceiver/transducers 32, 34 may be communicated to a single processor 50. In this implementation, the single processor 50 will process the sensor dynamic output signals using the data analysis and control functions described in greater detail herein, such that it appears as if the results are computed in a generally parallel fashion. Alternatively, more processors 50 can be used and each processor may be utilized to process one or more transceiver/transducers 32, 34 dynamic signals, e.g., depending for example, upon the computation power of each processor.

Monitoring and Control System Operation

Figure 10:
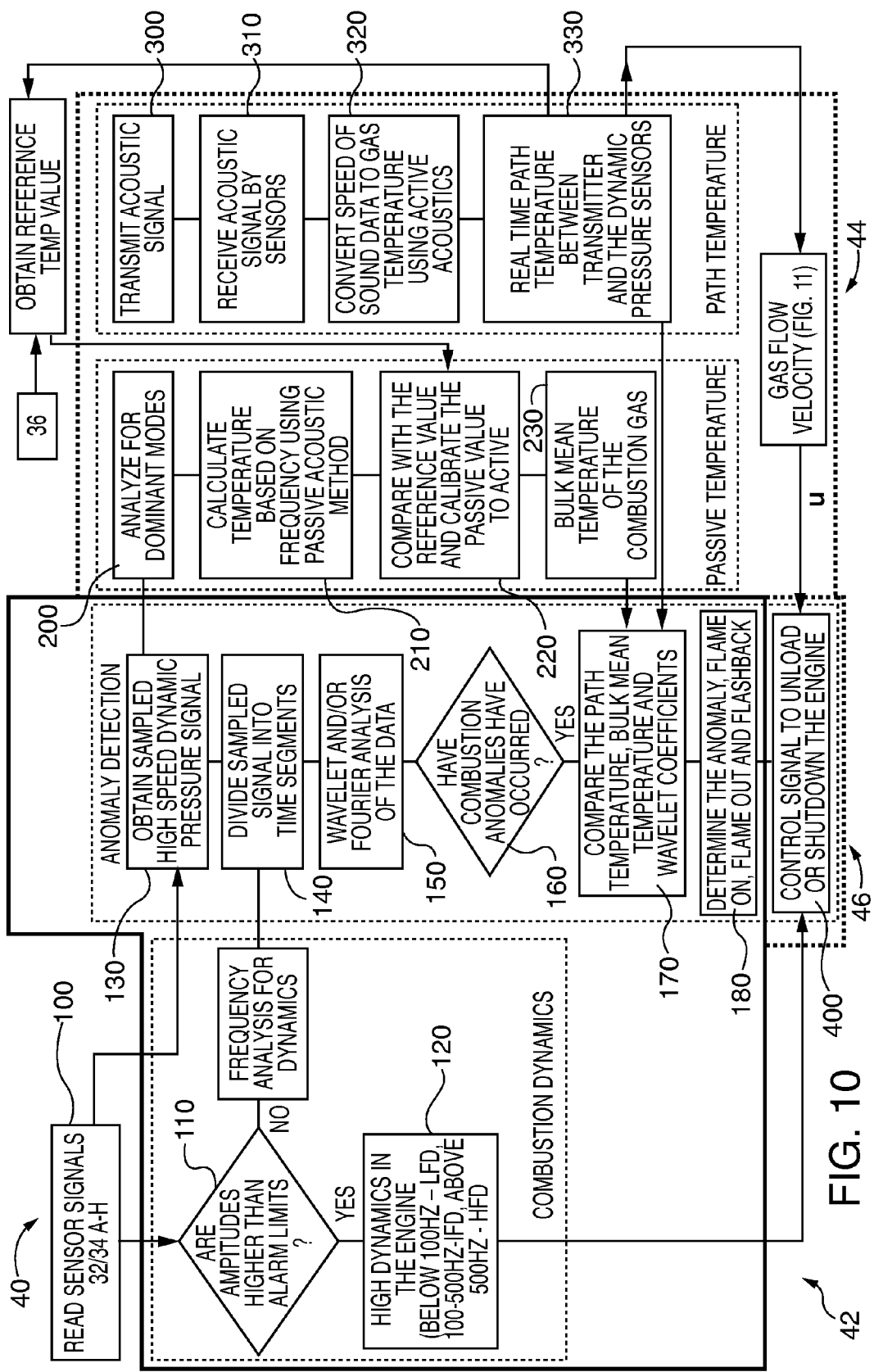
FIG. 10 is a flow chart illustrating implementation of an embodiment of the methods for measuring gas flow velocity and temperature active measurement in a gas turbine combustor, in accordance with embodiments of the invention.
Figure 11:
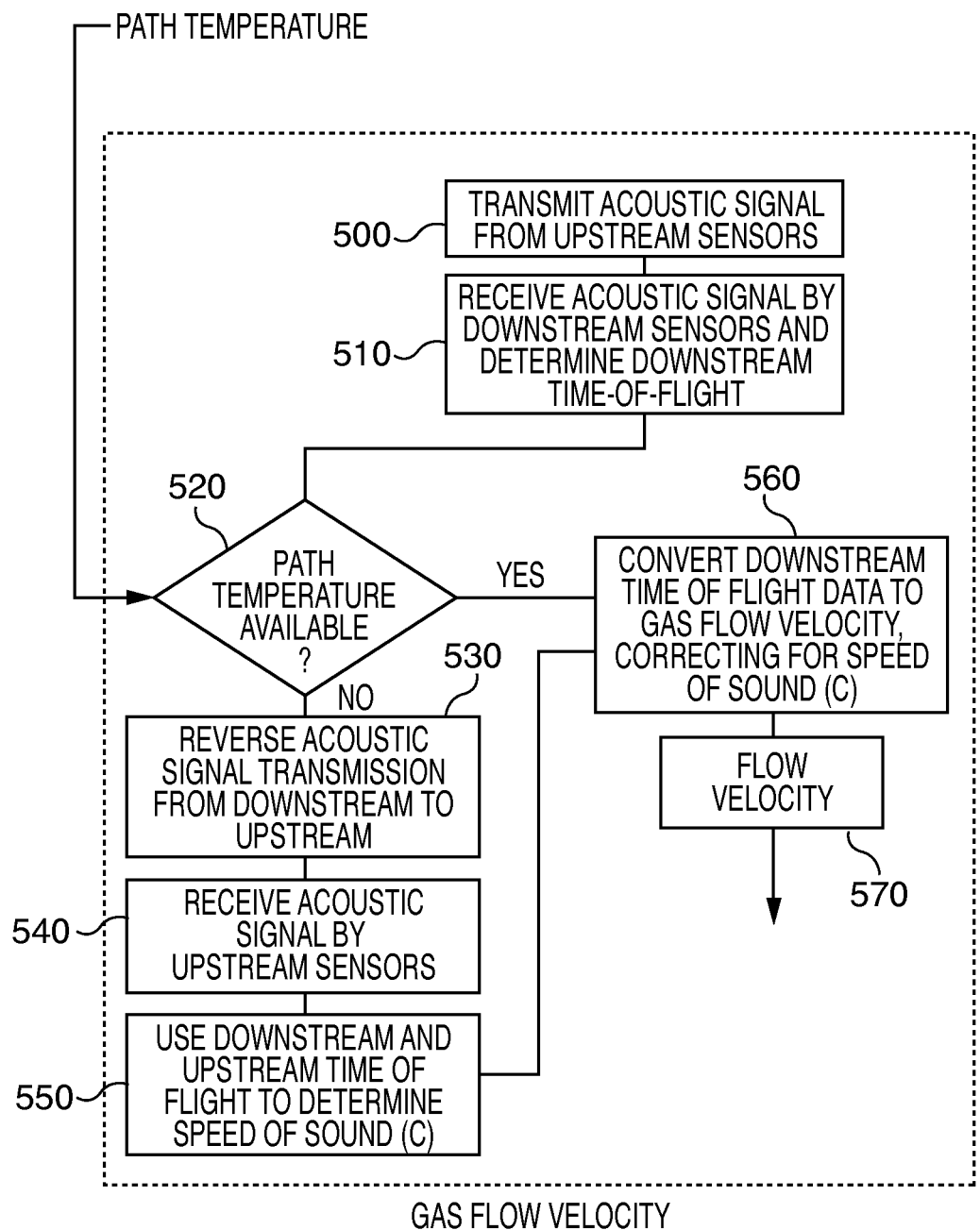
FIG. 11 is a flow chart illustrating implementation of an embodiment of the method for measuring active gas flow velocity, in accordance with embodiments of the invention.

The concepts of acoustic temperature and velocity measurements are both based on creating a sonic wave, listening to it across the gas stream and finding an average speed of sound across a given path, which is then descriptive for the gas velocity or velocity/temperature. FIGS. 10 and 11 are flow charts illustrating graphically exemplary operation of a monitoring and control system 29 embodiment of the invention that actively monitors and measures both gas flow velocity and temperature using acoustic measurement methodologies. The thick solid and dotted line operational blocks relate to previously described combustion dynamics analysis 42 (solid block), temperature monitoring and determination 44 and gas turbine control 46 functions (including by way of example IGT control functions) that are performed within the controller 40. In step 100 sensor signals generated by the sensor components within the transceiver/transducers 32A-H, 34A-H are read. In step 110 amplitudes of one or more of the sensor signals are compared to previously established alarm limits. For example in IGT applications the step 120 low frequency dynamics (LFD) below 100 Hz are of importance because of potential resonance influence at the 50 Hz or 60 Hz engine rotational speed. Other frequency bands of interest are intermediate frequency dynamics (IFD) between approximately 100-500 Hz and high frequency dynamics (HFD) above 500 Hz. If an alarm limit is exceeded the controller 40 sends a control command, for example to the fuel injection system 28, to unload or shut down the engine 10 in step 400.

If an alarm limit is not exceeded in step 110, then frequency analysis for dynamics is performed in anomaly detection portion of the combustion dynamics analysis subsystem. An exemplary description of how to perform anomaly detection is in U.S. Pat. No. 7,853,433 that is incorporated herein by reference. The sampled high speed dynamic pressure signal is obtained from the sensors in step 130 and time divided into segments in step 140. In step 150 the time-frequency divided sample segments are analyzed using the wavelet analysis technique described in U.S. Pat. No. 7,853,433. Alternatively, a known Fourier spectral analysis that converts the time segments into frequency space, analyzes dominant frequencies by identifying the peak frequencies and their respective amplitudes, and identifies amplitudes exceeding defined thresholds. If it is determined that a combustion anomaly or anomalies have occurred in step 160 the combustor temperature as determined in the temperature monitoring and determination subsystem 44 is compared with the anomaly information obtained by the Fourier or wavelet analysis techniques, or both. In step 180 the anomaly classification as a flame on, flame out or flashback is made in conjunction with the passive or path temperature information obtained from the temperature monitoring and determination subsystem 44. For example in a gas turbine flameout the combustor temperature drops off dramatically. Conversely in a flashback scenario the combustor temperature rises dramatically upstream within the combustor 14. When the anomaly determination is made in step 180 appropriate control signals to unload or shut down the engine are made in the engine control system 46.

The temperature monitoring and determination subsystem 44 may comprise passive temperature determination utilizing the passive acoustic method described in United States patent application "Temperature Measurement in a Gas Turbine Engine Combustor; filed on Mar. 14, 2013, Ser. No. 13/804,132, incorporated by reference herein, and/or real time actual path temperature determination within the combustor 14. Real time actual path temperature is determined by adaptation of the 2-D planar acoustic pyrometry technique for gas turbine exhaust system temperature determination described in United States Patent Publication No. US2012/0150413 (also incorporated by reference herein) or by a 3-D technique that determines one or more path temperatures between the sensor arrays 32/34 of FIG. 5, that is farther described in greater detail herein.

In the passive temperature determination method, sampled high speed dynamic pressure signals from the transceiver/transducers 32/34, such as obtained in step 130 are analyzed for dominant modes in step 200. Combustor temperature is calculated based on frequency using the passive acoustic method in step 210. The passive value is calibrated with a reference temperature value in step 220 in order to obtain an active temperature value within the combustor 14. The calibrated passive temperature value determined in step 220 is utilized in step 230 to determine the bulk mean temperature of the combustion gas in step 230. The reference temperature value used in step 220 may be obtained from one or more thermocouples 36 in the combustor or thermocouples located in the exhaust system 18 (not shown). The reference temperature value may be an actual path temperature measured in the exhaust system 18, as described in United States Patent Publication No. US2012/0150413 or a real time path temperature measured in the combustor 14 that is determined in steps 300-330.

The 2-D real time path temperature is measured by transmitting one or more acoustic signals in an acoustic transceiver/transducer 32, 34 or other discrete transmitter, such as in the 2-D planar pattern shown for the (n=8+ transceiver/transducers 32A-H in FIG. 9. For example, transceiver/transducer 32A transmits a signal that is received by the remaining (n−1) transceiver/transducers 32B-H and the time-of-flight for each line-of-sight path is determined. However, at least one, preferably two or more sensor elements in the remaining transceiver/transducers 32B-H receive the acoustic signal(s) in step 310. Preferably in practice several transceiver/transducers (transmit and receive acoustic signals) circling one plane such that the paths between all transceivers form a grid with desired coarseness which results in the spatial resolution of the temperature measurement. For example, for a cylindrical combustor the transceivers could be equally spaced around the periphery as shown in FIGS. 3 and 9. These could be either fired sequentially (one at a time) or simultaneously with disjoint sound patterns that can be readily differentiated. For sequential firing one transceiver is creating sounds while all remaining transceivers record it to estimate the travel time for the respective paths. Each of these line-of-sight paths represents an average temperature along that path. The average temperatures over different paths are combined to a two-dimensional map shown in FIG. 9, using a known computer tomography technique.

The 2-D time-of-flight sound data are converted to gas temperature using active acoustics in step 320, such as by utilization of the methods described in the aforementioned United States Patent Publication No. US2012/0150413 that is incorporated by reference herein. The real time path temperature that is determined in step 330 is the localized active temperature value along the line-of-sight transmission path. A plurality of active temperature values measured along different acoustic paths by performing the steps 300-330 can be utilized to determine the combustor 14 bulk temperatures, alone or in parallel with the dominant frequency passive acoustic method of steps 200-230. While a single path active temperature measurement between a single transmitter 30 and acoustic sensor 32 provides useful control information, arraying a plurality of transceiver/transducers 32, 34 selectively in any axial, circumferential and/or radial pattern or combinations thereof within a combustor 14 (see, e.g., FIG. 2, 3, 5, or 9) or in a series of combustors 14 facilitates active real time two or three-dimensional combustion temperature monitoring within the gas turbine engine 10.

The 2-D or 3-D real time path temperature determined in steps 300-330 can be utilized as an input for other monitoring and control functions, with or without one or more of the combustion dynamics analysis 42, passive temperature monitoring and determination 44 and control 46 functions described in the exemplary integrated monitoring and control system 29 described herein. For example combustor turbine inlet temperature (TIT) can be actively monitored in real time and used as a control parameter for the combustion process. The combustion active path temperature determined in steps 300-330 can be utilized to control the fuel/air mixture in the combustor 14 via the fuel injection system 28. The real time path active temperature can be utilized as an input for active actual gas flow velocity measurement in an industrial gas turbine combustor or in other types of gas flow environments.

Embodiments of the present invention measure 3-D gas flow velocity and/or gas flow temperature by correlation with sonic time-of-flight along a line-of-sight sonic pathway between axially spaced, transversely oriented sonic transmitter and sensor (or transceiver/transducers incorporating the sensors and transmitters), so that the line-of-sight along the pathway is oriented transverse, as opposed to parallel to the gas flow path. In order to determine gas flow absolute velocity, the time-of-flight data are corrected or compensated for thermodynamic influences on gas temperature, gas constant and speed of sound. As noted above gas temperature along a line of sight can be determined using the real time active path temperature or temperature independently obtained from another measurement device (e.g., thermocouple 36). Alternatively localized speed of sound c can be determined by measuring bi-directional time-of-flight (i.e., forward/downstream transmission and reverse/upstream transmission). The aforementioned thermodynamic influences are governed by the known equation:

$$c(x,y,z) = (\gamma \cdot R \cdot T)^{1/2}$$

Where:
c(x,y,z) is the isentropic speed of sound;
$\gamma$ is specific heat ratio;
R is the gas constant; and
T is the gas temperature.

Therefore, once the speed of sound along a path is known, the average path temperature and absolute velocity can be determined utilizing embodiments of the invention further described herein.

For accurate absolute velocity or temperature measurement, two planes of transceiver/transducers 32, 34 are oriented in axially spaced, opposed relationship within the gas flow, as shown in FIG. 5. The two transceiver/transducer planes 32, 34 are preferably apart by approximately the same order of magnitude as the diameter (circular) or width (square or rectangular) of the monitored gas flow geometry. That is, the axial distance between the two planes should be determined according to the geometry and scale of the interrogated environment as well as the anticipated or possible ranges of gas flow gas constant, temperature and velocity.

Figure 8:
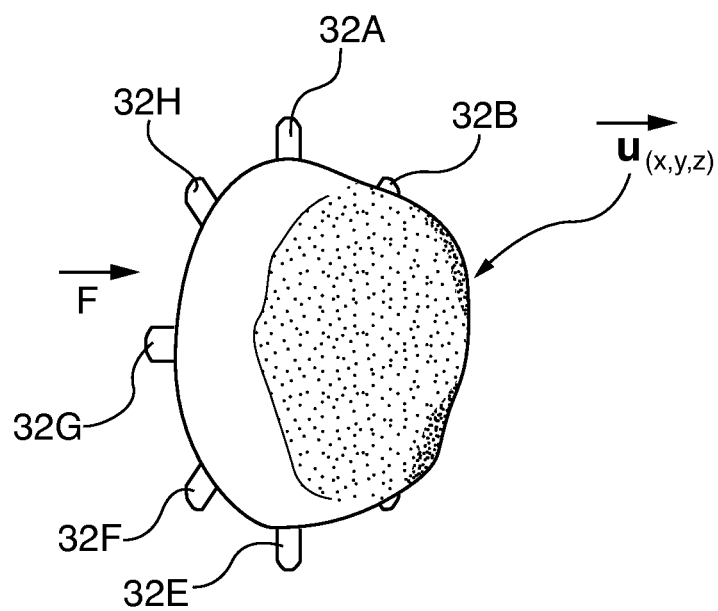
FIG. 8 is a composite gas flow velocity profile of the respective velocities measured by the gas flow velocity monitoring system, in accordance with embodiments of the invention.

For gas flow velocity estimation, the gas flow is measured axially and transverse to the flow direction. For example, when transceiver/transducer 32A in plane $Z_I$ fires or transmits a signal, all transceiver/transducers 34B-H in plane $Z_{II}$ that are not parallel-aligned with the signal firing sensor will be listening, thereby creating several paths across the gas flow (n−1 paths for n sensors). The signal transmitting/receiving firing process continues sequentially with the second transceiver/transducer 32B on plane $Z_I$ firing to the remaining (n−1) transceiver/transducers 34A and 34C-H, which receive that transmitted signal. The transmitted signal firing will continue on with the consecutive transceivers firing and creating n−1 paths for each firing. In the embodiment of FIG. 5, having 8 transceivers/transducers in each of the two axially spaced arrays there are a total of 64 paths in three dimensions. In addition, to alleviate the directional ambiguity of the velocity (to identify reverse flows and perhaps turbulence fluctuations in reverse direction) the same process will be repeated with transducer/transceivers 34 in plane $Z_{II}$ firing and transceiver/transducers in plane $Z_I$ receiving the reverse direction transmitted acoustic signal, assuming that the gas flow temperature is already known. Instead of transmitting/firing acoustic signals sequentially from each transceiver/transducer, a sound pattern with a slightly different acoustic signature can be transmitted from each respective transceiver/transducer 32A-H, 34A-H simultaneously, which shortens measurement time Referring to steps 500 and 510 of the gas flow velocity measurement method flow chart of FIG. 11, once all transceiver/transducers in planes $Z_I$ and $Z_{II}$ have fired and the transmitted acoustic signals have been received by the opposing plane of transversely aligned transceivers/transducers, the process preferably repeats continually in real time while a 3-D velocity map u is constructed from the spatially distributed line-of-sight acoustic paths, using known 3-D tomographic mapping techniques, such as those utilized in medical or industrial computed tomography systems. The velocity information is extracted and mapped, as shown in FIG. 8. Similarly, a 3-D temperature map T can be constructed utilizing the time of flight data, as will be described in greater detail herein.

After all of the transceiver/transducers 32, 34 in a planar array have fired acoustic signals the respective line-of-sight flow path time-of-flight data are used to derive absolute velocity in the gas flow path in step 560, once corrected for the thermodynamic effects of temperature, gas constant and the speed of sound, as described in greater detail below. Flow velocity measurement accuracy potentially decreases as flow velocity approaches the speed of sound, assuming constant gas temperature in the velocity measurements. Flow velocity below a Mach number of approximately 0.5 is not believed to impact velocity measurement significantly. Therefore it is preferable, but not required, that measured flow velocities should be smaller than half of the local speed of sound that is measured. This method can accurately measure high temperature gas flows, including turbine engine gas flows, despite relatively high absolute velocities, because the local speed of sound increases with temperature.

Figure 6:
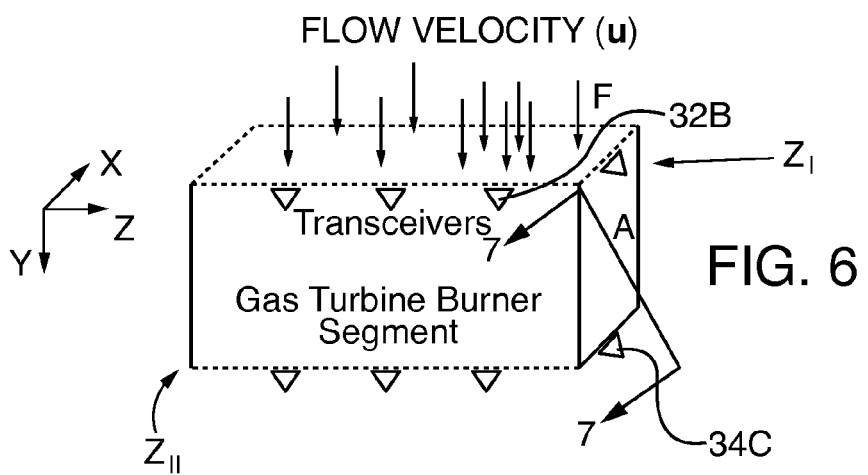
FIG. 6 is an exemplary schematic representation of gas flow velocity in the turbine combustor of FIG. 5 in the line-of-sight between acoustic sensors 32B and 34C.
Figure 7:
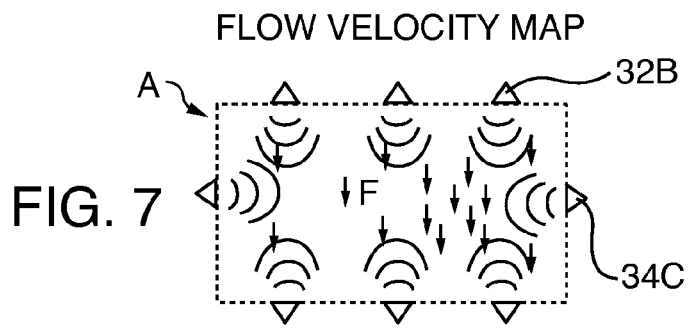
FIG. 7. is a cross-sectional slice A of the gas flow velocity of FIG. 6 taken along 7-7 thereof, which corresponds to the line-of-sight between acoustic sensors 32B and 34C.

Once acoustic time-of-flight data are available, they are used by the monitoring and control system 29 or other remote monitoring system to determine velocity along their respective acoustic paths in accordance with the remainder of the steps of FIG. 11. Referring to FIGS. 6 and 7, information sound propagation is linearly affected by the gas flow. Relative gas flow velocity for a given temperature, gas constant and speed of sound is determined by the known equation:

$$t_{BC} = \int_B^C \frac{1}{c(x, y, z) + \vec{p}_{BC} \cdot \vec{u}(x, y, z)} ds$$

Where:

$t_{BC}$ is the time-of-flight from the first transmitter B to the first sensor C;

c is the speed of sound in the gas flow for the temperature and gas constant;

$\vec{p}_{BC}$ is the unit vector along the first line of sound path A between B and C; and $\vec{u}(x, y, z)$ is velocity vector in the gas flow.

The exemplary planar slice along the line-of-sound path A shows a simplified flow pattern. Referring again to the flow chart of FIG. 11, the relative gas flow velocity is corrected for thermodynamic temperature, gas flow and speed of sound influences, in order to derive absolute velocity in step 560. If the path temperature is available (step 520) its influence on the speed of sound can be corrected by known tomography methods, in order to derive the gas flow absolute velocity along the line-of-sound path. If the path temperature is not available, times-of-flight for forward (steps 500, 510) and reverse (steps 530, 540) acoustic signal transmission are acquired and used to extract the speed of sound without effect of the gas velocity in accordance with the following equations. The reverse time-of-flight from transducer/transceiver C to transducer/transceiver B is determined by the following equation, similar to that for the forward or downstream direction set forth above:

$$t_{CB} = \int_C^B \frac{1}{c(x, y, z) + \vec{p}_{BC} \cdot \vec{u}(x, y, z)} ds$$

The forward and reverse times-of-flight are added in accordance with the following equation:

$$t_{BC} + t_{CB} = \int_B^C \frac{2 \cdot c(x, y, z)}{c(x, y, z)^2 - \vec{p}_{BC} \cdot \vec{u}(x, y, z)^2} ds$$

Given that the square of the speed of sound c is much greater than the square of the gas flow velocity u, the equation is reduced to:

$$t_{BC} + t_{CB} \approx \int_B^C \frac{2}{c(x, y, z)} ds$$

where:

$t_{BC}$ is the time of flight from the first transceiver/transducer B to the second transceiver/transducer C;

$t_{CB}$ is the time of flight from the second transceiver/transducer C to the first transceiver/transducer B;

c is the speed of sound in the gas flow for the temperature and gas constant;

$\vec{p}_{BC}$ is the unit vector along the first line of sound path; and $\vec{u}(x, y, z)$ is the velocity vector in the gas flow.

The speed of sound c determined in step 550 of FIG. 11 is then used to correct the downstream time-of-flight data for that speed of sound in step 560. The corrected downstream time-of-flight data are used to determine gas flow absolute velocity in step 570. Where the path temperature T along a line-of-flight is not known, the same speed of sound c determined in step 550 is utilized in some embodiments of the invention to determine T, using the previously described isentropic speed of sound relationship $c(x, y, z) = (\gamma \cdot R \cdot T)^{1/2}$, as $\gamma$, R and c(x, y, z) are now known. In a similar manner to the path velocity determinations previously described, once all the path temperatures T are known from each receiver/transmitter unit back and forth, there will be 64 (assuming exemplary 8-sensor case) iso-temperature lines in 3-dimensions. Then using known 3-D tomographic mapping techniques, the 3-dimensional temperature distribution is mapped.

Advantageously the active acoustic temperature and velocity measurements are performed simultaneously in real time, thus mapping both gas flow temperature (3-D or alternatively the 2-D mapping of FIG. 9) and 3-D gas flow velocity (FIG. 8). An exemplary acoustic signal transmission and reception timing sequence to perform simultaneous velocity and temperature measurement is to emit an acoustic signal with a transceiver/transducer on a first array plane (e.g., 32A at $Z_I$). The corresponding transversely oriented transceivers/transducers on an axially spaced opposed second plane (e.g., 34B-H at $Z_{II}$)) receive the signal for velocity processing and/or temperature processing, if 3-D temperature measurement is utilized. If only 2-D temperature measurement is utilized the remainders of the transceiver/transducers on the first array plane (e.g., 32B-H at ZI) receive the signal for temperature processing. As previously noted the transmission and receiving process also can be accelerated by utilizing unique signal transmission patterns for each transceiver transducer. There are tradeoffs associated with use of 2-D or 3-D temperature measurement. Where 3-D temperature measurement techniques are utilized, accuracy of both temperature and velocity map may not be the most desired in case of gas velocities of Mach 0.3 or above as the approximation shown in the equation $$t_{BC} + t_{CB} \approx \int_B^C \frac{2}{c(x, y, z)} ds$$

may be less accurate in those velocities ranges, because there are no independently determined temperature reference values. However, independent temperature T reference values may be determined, using a pair of axially separated 2-D acoustic signal sets and two individual acoustic temperature maps determined with the respective 2-D time-of-flight signal sets. The 2-D temperature maps are in turn interpolated to create a volumetric temperature map. This volumetric map will be used to provide the temperature values T utilized in the isentropic speed of sound equation, along with the known gas constant R and specific heat ratio γ to extract speeds of sound c. The speed of sound is then used to extract the velocity vectors u(x,y,z). Once the velocity vectors are extracted the velocity components can be mapped, eliminating the limitation of below Mach 0.3 gas velocities inherent in the previously descried 3-D velocity and temperature mapping methods.

Combustor active gas flow velocity or velocity/temperature monitoring utilizing the system and method embodiments described herein with arrays of commonly utilized acoustic sensors is believed to provide faster velocity and temperature change response than known velocity and temperature monitoring systems. In accordance with embodiments of the invention one array of commonly utilized, reliable acoustic transceiver/transducer sensor-transmitters or arrays of separate discrete acoustic sensors and transmitter pairs can be placed in a combustion flow path under field conditions and monitored to provide active, real time simultaneous velocity and temperature data and anomaly detection that are all useful for monitoring and control of combustion power generation equipment, such as industrial gas turbines.

Acoustic Transceivers for Gas Turbine Combustion Chamber Monitoring

Figure 12:
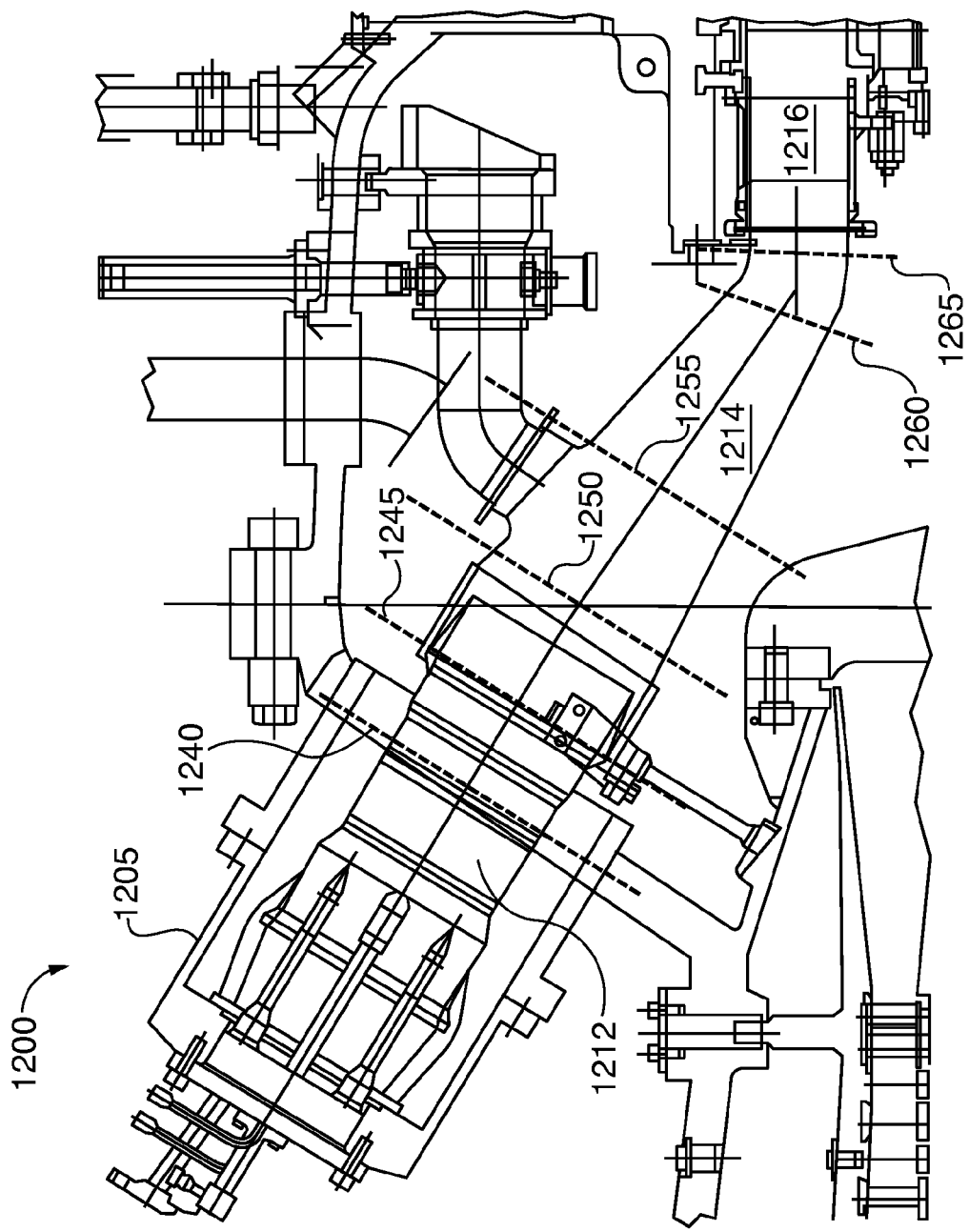
FIG. 12 is a cross-sectional view of a gas turbine combustor showing alternative possible locations for a monitoring system for determining combustor gas flow active velocity and temperature measurement, in accordance with embodiments of the invention.

In a partial cross sectional view of a gas turbine engine combustor and environs 1200 shown in FIG. 12, several possible installation locations are illustrated for transceiver arrangements for measuring a velocity and temperature field in or near a turbine combustor 1205. As noted above with reference to FIGS. 2 & 3, one possible configuration of the transceivers is a plurality of circular two-dimensional arrays positioned axially along a flow path of the combustor. The transceivers in each circular array may be evenly angularly spaced around a substantially circular cross section of the combustion chamber or combustion chamber outlet. In one embodiment, a pair of circular two-dimensional arrays of transceivers is positioned in an area of interest in or near the combustor. As used herein, the term "combustor" includes components of the combustor shell 1212, components within the combustor shell, as well as components of the transition component 1214 that connects the combustor shell to the turbine inlet 1216. To illustrate alternative transceiver array placements, three pairs of two-dimensional arrays are shown in the turbine combustor 1210: arrays 1240, 1245, arrays 1250, 1255 and arrays 1260, 1265.

The arrays 1240, 1245 are located within the combustor basket or liner (not shown) inside the combustor shell 1212. That installation may be used to map temperature and velocity parameters for the primary combustion zone where there is a flame. Temperatures and velocities in the primary combustion zone are useful for combustor designers to validate their designs and for computational tool developers to validate their combustion models.

The arrays 1250, 1255 are positioned on the transition component 1214 near the outlet of the primary combustion zone, while arrays 1260, 1265 are located at the exhaust end of the transition component 1214 near the inlet 1216 to the turbine section. Those arrays may be used to measure combustor exit temperature and velocity or turbine inlet temperature and velocity, which is of interest to both combustor (transition component) designers and turbine designers and may complement the use of computation fluid dynamic simulators by those designers.

The transceiver array pair 1240, 1245, the alternative pair 1250, 1255 and the alternative pair 1260, 1265 are configured and utilized in accordance with the concepts and principles set forth above with reference to FIGS. 5, 6 & 7, regardless of the location of the planes of the arrays in or near the gas turbine engine combustor. The schematic diagram of FIG. 5 illustrates a single transmitting transceiver 32A. It should be recognized, however, that all the transceivers are firing either with slightly different acoustic signals simultaneously, or with the same acoustic signal sequentially, to track and identify the firing transceiver for time of flight calculations. The signals are continuously emitted and are parallel processed using complex algorithms and high power computational hardware such that the computed temperatures and velocities are available in real time.

While temperature and velocity information from within the combustor or proximate the combustor outlet are extremely useful for design and control of that subsystem, the extreme temperature conditions of the combustor present challenges in collecting the raw acoustic data used in computing that information. The acoustic transmitters and receivers must accurately determine time-of-flight while withstanding high temperatures and electromagnetic interference and not disrupting the flow within the combustor.

Figure 13:
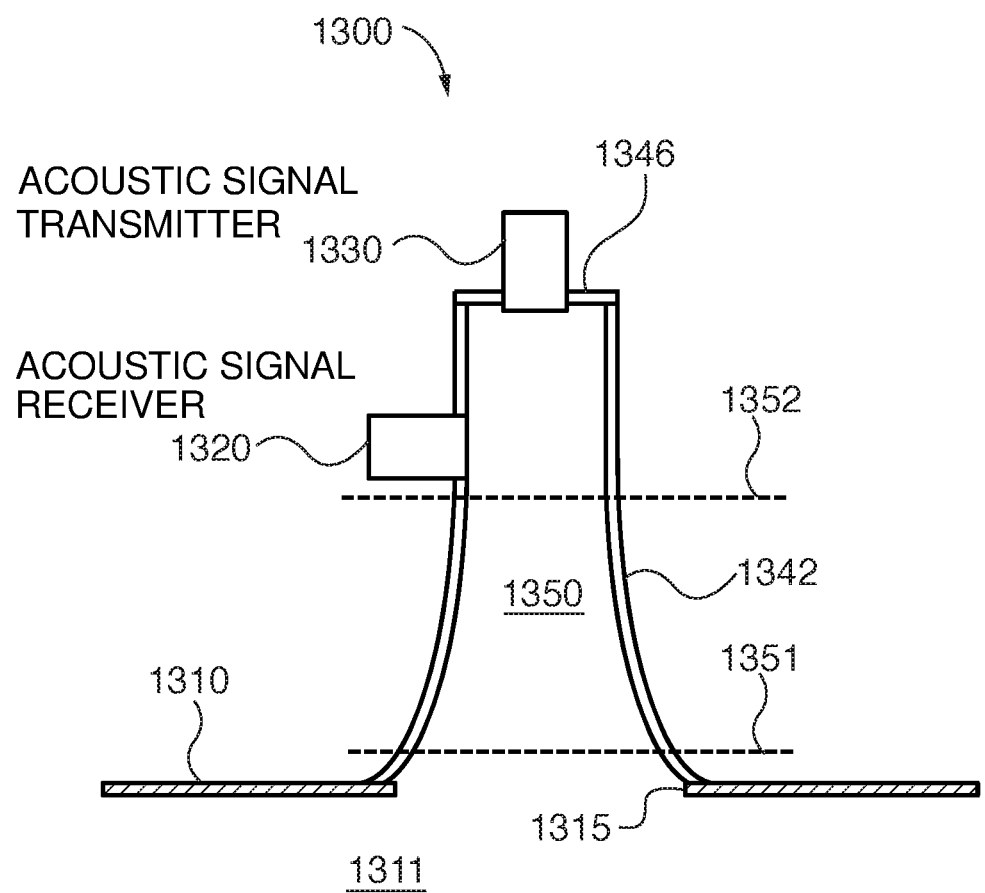
FIG. 13 is a cross-sectional view of an acoustic transducer mounted on a wall of a gas turbine component in accordance with embodiments of the invention.

An exemplary acoustic transceiver 1300 in accordance with one embodiment of the present disclosure, shown in FIG. 13, includes a housing 1342 defining a measurement chamber 1350. The housing 1342 is attached to a wall 1310 of a gas turbine component such as a combustor shell 1212 or a combustor transition component 1214, shown in FIG. 12. Returning to FIG. 13, the measurement chamber 1350 is in communication with an interior 1311 of the gas turbine component through an opening 1315 in the gas turbine component wall 1310. The opening 1315 creates continuity between gases in the interior 1311 of the gas turbine component and gases within the measurement chamber 1350. Acoustic signals propagating in the interior 1311 of the gas turbine component propagate through the opening 1315 into the measurement chamber 1350. Conversely, acoustic signals propagating in the measurement chamber 1350 propagate through the opening 1315 into the interior 1311 of the gas turbine component.

The housing 1342 may be attached to the gas turbine component wall 1310 permanently, as by welding or brazing, or may be connected using fasteners such as screws, clamps, rivets or integral mounts such as threaded mounts, bayonet mounts, etc.

Time-of-flight measurements are made along lines-of-sound extending between pairs of openings 1315 in the gas turbine component wall 1310 corresponding to pairs of transceivers 1300. The additional propagation time of the acoustic signals within the measurement chambers 1350 of the pair of transceivers 1300 may be compensated for using approximations based on the fixed distances within the chambers, or may be ignored as insignificant.

The transceiver 1300 includes an acoustic signal receiver or microphone 1320 mounted for receiving acoustic signals propagating within the measurement chamber 1350. The receiver 1320 has access to the measurement chamber through an opening in the housing 1342. The receiver may be located in a central region of the housing between the opening 1315 in the turbine component wall 1310 and an acoustic transmitter 1330 as described in more detail below.

The housing 1342 may be shaped to optimally guide acoustic waves propagating from the interior 1311 of the gas turbine component through the measurement chamber to the receiver 1320. For example, the housing may include an acoustic horn or bell-shaped section having a cross sectional area in a plane 1351 near the gas turbine component wall 1310 that is larger than a cross sectional area in a plane 1352 near the receiver 1320. The bell-shaped section may include a conical, exponential, tractrix quadratic, oblate spheroidal or elliptic cylindrical taper designed for maximum efficiency at the expected frequency range of the received acoustic signals. The section 1345 of the housing 1342 between the receiver 1320 and the transmitter 1330 may be cylindrical in shape.

The transceiver 1300 further includes an acoustic signal transmitter 1330 mounted for transmitting or creating acoustic signals that propagate through the measurement chamber 1350 and through the opening 1315 to the interior 1311 of the gas turbine component. The transmitter may be covered by a cap 1346 covering an end of the housing 1340 opposite the opening 1350. The housing is therefore closed, preventing gas from escaping through the transceiver 1300 and bypassing the turbine section.

By placing the transmitter 1330 and the receiver 1320 in communication with the measurement chamber 1350, and not directly in communication with the interior 1311 of the gas turbine component, the transmitter and receiver are partially protected from the extreme environment within the gas turbine component. For example, transceiver arrays 1240, 1245 (FIG. 12) placed on the combustor basket 1212 are exposed directly to combustion flame within the basket. The measurement chamber 1350 (FIG. 13) of the transceiver provides some separation from those conditions for the transmitter 1330 and the receiver 1320. Acoustic signals, however, freely propagate between the measurement chamber 1350 and the interior 1311 of the gas turbine component, permitting accurate measurement. Further, the transmitter 1330 and the receiver 1320 do not impinge directly into the interior 1311 of the gas turbine component, minimizing disruption of the flow characteristics that are to be measured.

The arrangement provides a modular transceiver arrangement wherein the transmitter and receiver are conveniently mounted together on the turbine combustor. An acoustic signal from the transmitter 1330 is received directly by the receiver 1320 without degradation, providing an accurate signature for use in identifying the acoustic signal at other transceivers in the system and for the calculation of time-of-flight using phase shifting or other means.

While removed from the extreme conditions within the combustor, the acoustic transmitter 1330 must nevertheless withstand high temperatures even within the measurement chamber 1350. To address that problem, embodiments of the present disclosure include transceivers using a spark gap as an acoustic transmitter, or alternatively using a whistle as an acoustic transmitter. Each embodiment is described in detail below. The appropriate transmitter is selected based on the expected conditions both inside and outside the combustor. One skilled in the art will recognize that other robust acoustic transmitters may be used in the disclosed transceiver without departing from the spirit of the invention.

Figure 14A:
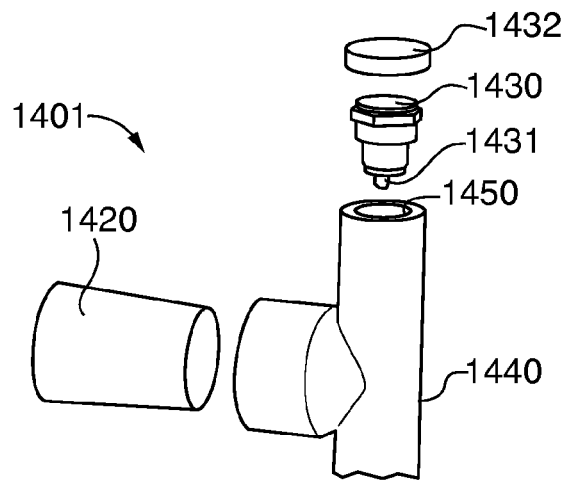
FIG. 14A is an exploded, perspective view of an acoustic transducer assembly including a spark gap acoustic transmitter in accordance with embodiments of the invention.
Figure 14B:
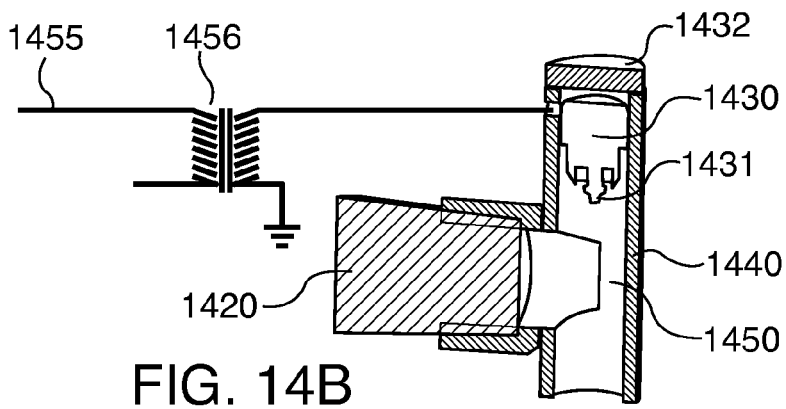
FIG. 14B is a perspective view of a cross section of the acoustic transducer assembly of FIG. 14A including a spark gap acoustic transmitter in accordance with embodiments of the invention.
Figure 14C:
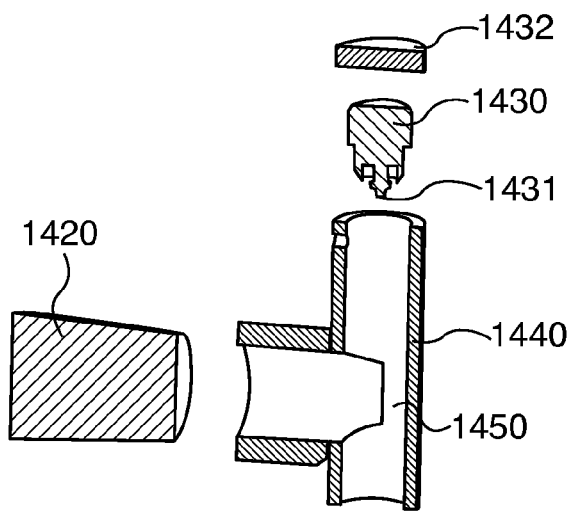
FIG. 14C is an exploded, perspective view of a cross section of the acoustic transducer assembly of FIG. 14A including a spark gap acoustic transmitter in accordance with embodiments of the invention.

In an exemplary transducer 1401 shown in FIGS. 14A, 14B, 14C, a spark gap acoustic transmitter 1430 defining a spark gap 1431 is utilized as an acoustic transmitter to transmit the acoustic signal in the chamber 1450. The spark gap acoustic transmitter can withstand very high gas temperatures of up to 1000-1200 deg C in the immediate area. A cover or cap 1432 may be used to seal the distal end of the housing 1440 and prevent gases from the combustor from bypassing the turbine section by passing through the transceiver 1401. A sensor or microphone 1420 detects acoustic signals in the measurement chamber 1450. While the housing 1440 is shown as a cylindrical housing, it may be shaped as described above to guide acoustic waves to the sensor 1420.

A low voltage electrical line 1455 (FIG. 14B) is used to transport electrical energy close to the spark gap transmitter 1430, where a high voltage step-up transformer 1456 is used to pulse the high energy that creates a strong acoustic signal. The emitted sound pattern cannot be precisely controlled, as it can with signals emitted from other sound sources. Some control of the loudness and frequencies of the signal is possible, however, by changing the spark gap.

Figure 15A:
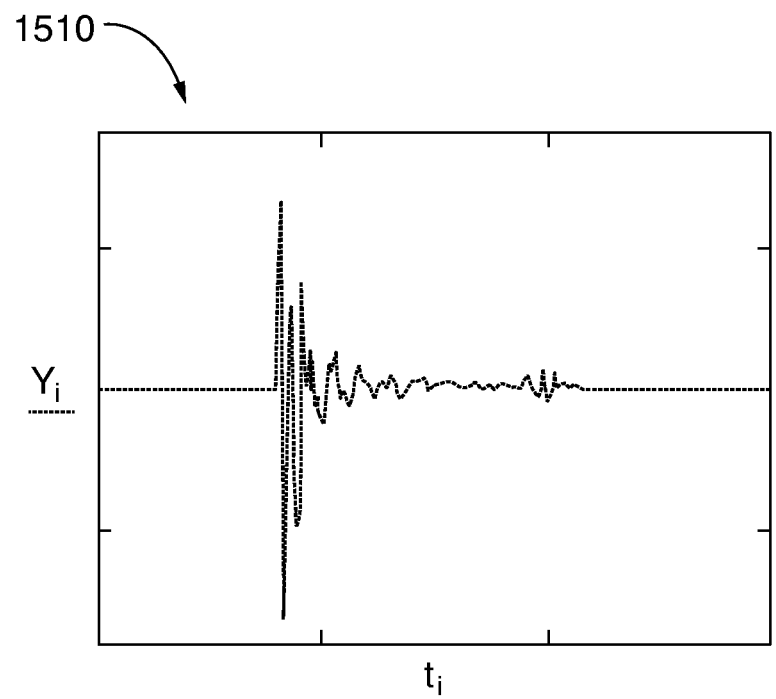
FIG. 15A is a time-domain graph showing an acoustic signal from a spark gap acoustic transmitter in accordance with embodiments of the invention.

As can be seen in a time domain graph of an acoustic signal pulse 1510 from an example spark gap source, shown in FIG. 15A, the signal duration is on the order of 1 millisecond. That short signal duration, together with the ability to control the approximate timing of the spark, allows a particular acoustic signal from a particular transceiver to be identified as such by the other transceivers. Specifically, after a pulse is sent to a spark gap transmitter 1430 in a sending transceiver 1401 (FIG. 14), the acoustic sensor 1420 in that transceiver is used to determine a precise origination time for the acoustic signal. Based on the origination time and an expected approximate time-of flight to receiving transceivers, the receiving transceivers can identify the signal as having originated at the sending transceiver. Optionally, an acoustic signature of the signal may be recorded by the sensor in the sending transceiver for use in identifying the signal at the receiving transceivers. The process is then repeated in rapid succession for each transceiver in the system as a sending transceiver.

Time-of-flight of a spark gap acoustic signal may be determined by observing a phase shift between signals received by acoustic sensors in the sending and receiving transceivers. Alternatively, another characteristic or signature within the signal may be used as a timing indicator.

Figure 15B:
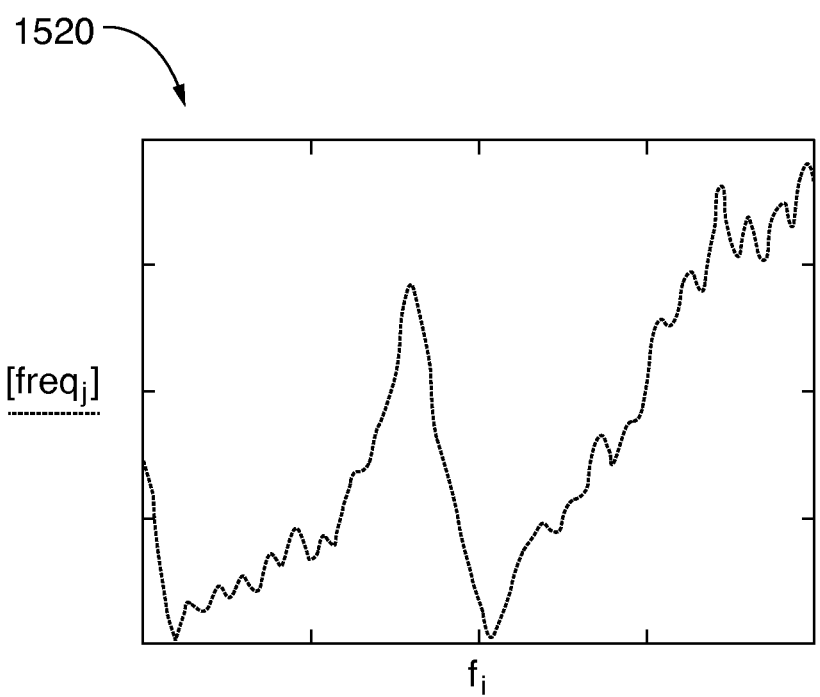
FIG. 15B is a frequency-domain graph showing an acoustic signal from a spark gap acoustic transmitter in accordance with embodiments of the invention.

A frequency domain graph of an acoustic signal pulse 1520 from a spark gap acoustic transmitter, shown in FIG. 15B, indicates that much of the signal content is concentrated in the higher frequency ranges. For example, the inventors have found it advantageous to use a pulse having 40% of the energy of the signal at frequency of over 15 kHz. In another embodiment, 60% of the energy of the signal is over 15 kHz. That high frequency signal content is advantageous as the background noise of the combustor is quieter at those frequencies. A high signal-to-noise ratio can therefore be achieved for the received acoustic signal across the gas path, increasing the accuracy of the measured time-of-flight signal.

Figure 16A:
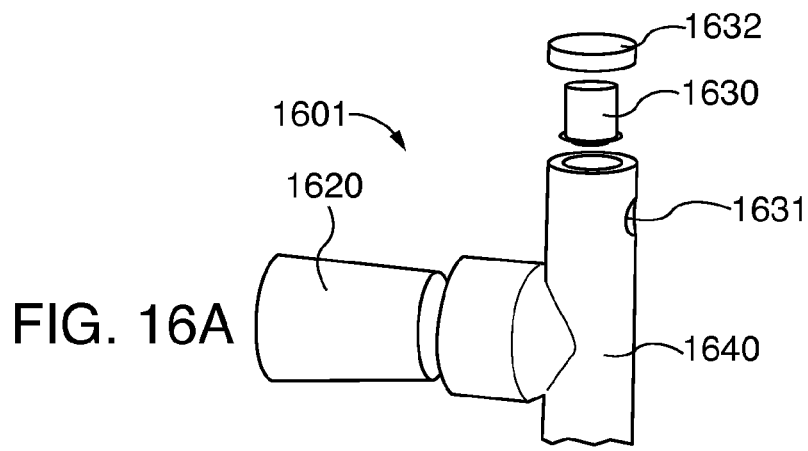
FIG. 16A is an exploded, perspective view of an acoustic transducer assembly including a whistle acoustic transmitter in accordance with embodiments of the invention.
Figure 16B:
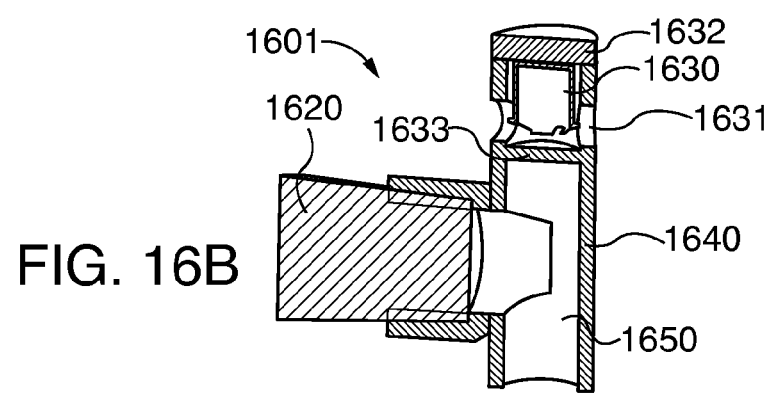
FIG. 16B is a perspective view of a cross section of the acoustic transducer assembly of FIG. 16A including a whistle acoustic transmitter in accordance with embodiments of the invention.
Figure 16C:
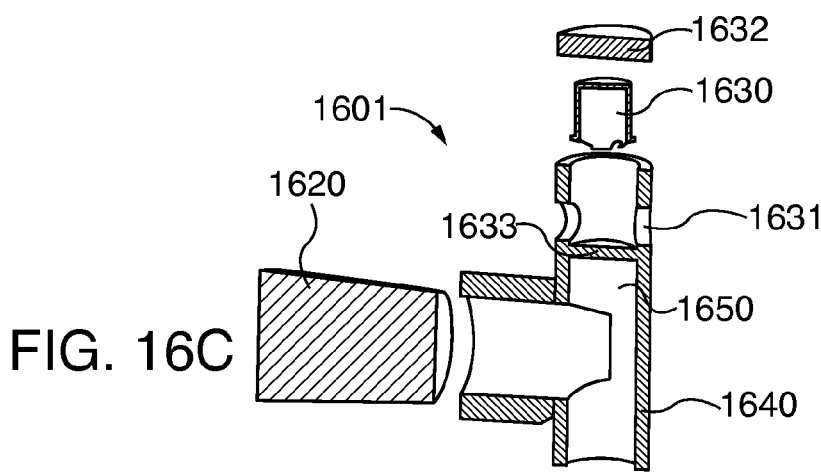
FIG. 16C is an exploded, perspective view of a cross section of the acoustic transducer assembly of FIG. 16A including a whistle acoustic transmitter in accordance with embodiments of the invention.

An alternative exemplary embodiment of a transceiver 1601, shown in FIGS. 16A, 16B, 16C, includes a whistle acoustic transmitter 1630 mounted in the distal end of the transceiver housing 1640. The whistle may be activated by a cooling gas flow on the outside of the combustor, which is commonly used to control combustor temperatures in gas turbines. That approach is effective in cases where there is significant cooling flow outside the combustor, such as within a flow sleeve. A guide tube (not shown) may be used to guide a portion of the cooling flow over the whistle 1630. Inasmuch as the whistle acoustic transmitter 1630 must function under high-temperature conditions, the transmitter is constructed of a high temperature alloy capable of withstanding the extreme environment around the combustor basket. An aperture 1631 is provided in the transceiver housing 1640 to allow the cooling flow to pass by the Whistle 1630, creating an acoustic signal. A cap 1632 retains the whistle element 1630. An internal wall 1633 of the housing keeps flow from bypassing the combustor through the aperture 1631. The wall 1633 is designed to prevent flow while still conducting the acoustic signal from the whistle 1630 into the measurement chamber 1650. For example, the wall 1633 may be constructed of a membrane that is impermeable to the combustor working gases but conducts acoustic vibrations.

The whistle acoustic transmitter 1630 provides a passive signal, eliminating the necessity of wires or other attachments to the transmitter. The signal, however, is substantially continuous, and additional measures must be taken to identify the individual signals transmitted by individual whistle transmitters in a gas measurement system. To that end, each whistle transmitter 1630 in a system according to the presently described embodiment is individually tuned to transmit an acoustic signal at a unique frequency different from the frequencies of the other whistle transmitters in the system. Acoustic signals received by a sensor 1620 may then be readily attributed to the originating transceiver.

Figure 17A:
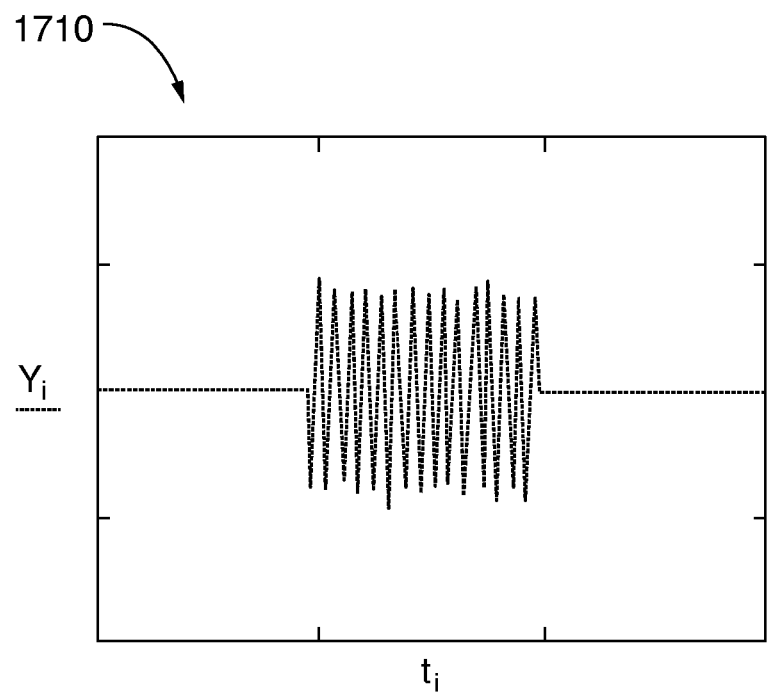
FIG. 17A is a time-domain graph showing an acoustic signal from a whistle acoustic transmitter in accordance with embodiments of the invention.
Figure 17B:
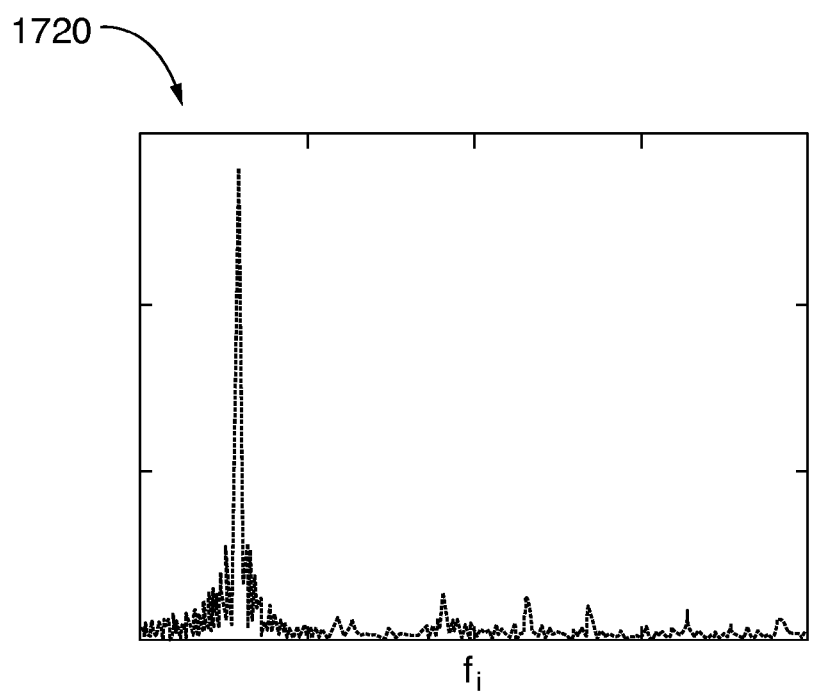
FIG. 17B is a frequency-domain graph showing an acoustic signal from a whistle acoustic transmitter in accordance with embodiments of the invention.

An example time series graph 1710 of a passive whistle acoustic signal, shown in FIG. 17A, and a frequency domain graph 1720 for the same signal, shown in FIG. 17B, indicate a relatively narrow frequency band for the signal. As a practical matter, the whistle acoustic transmitter used in testing by the inventors could be designed to emit a signal having a frequency signature centered at a value in approximately the 2-5 kHz range. Each whistle acoustic transmitter in an acoustic gas flow measurement system is assigned a unique frequency.

In contrast to the spark gap acoustic transmitters 1430 described above with reference to FIGS. 14-15, the whistle acoustic transmitters 1630 emit a continuous acoustic signal as long as cooling gases flow past the transceiver. No pulse is sent to the transmitter as part of the measurement cycle. Instead, when a time of flight measurement is to be made along a particular line-of-sound path, a phase shift or another timing characteristic or signature within the signal is measured between sensors in the originating and receiving transceivers. The unique acoustic signal frequency, or another identifying feature of the acoustic signal, is compared between sensors in the originating and receiving transceivers to assure that the same signal is being measured at both locations.

For purposes of timing the whistle transmitter signal between two transceivers, it is important to address the problem of ambiguities within the signal. A signal having a single, narrow band frequency peak, such as that shown in FIG. 17B, is close to a single-frequency sine wave and has an inherent amplitude ambiguity every 180 degrees. For example, a 5 kHz sine wave signal contains an amplitude ambiguity every 0.0001 second; a 3 kHz signal contains an ambiguity every 0.000167 seconds. For a transceiver distance of 35 cm, the time-of-flight is 0.001 seconds at a speed of sound of 343 m/s and is 0.0009 seconds for a speed of sound of 389 m/s. That means a system using a signal of 5 kHz cannot distinguish these two speed of sound signals and their respective temperatures.

Figure 18A:
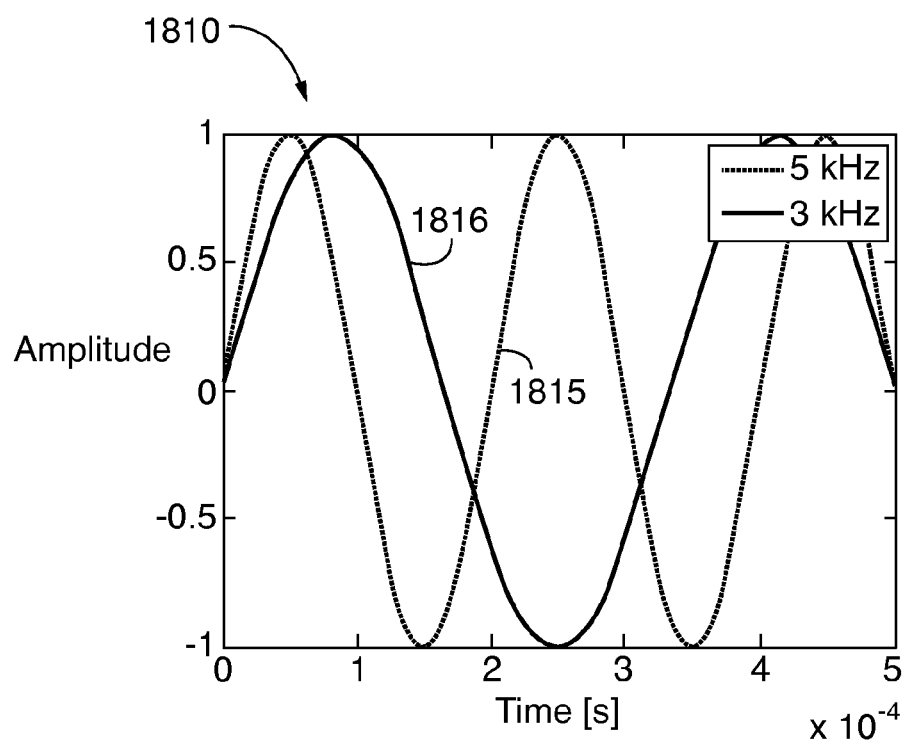
FIG. 18A is a time-domain graph showing a multi-frequency acoustic signal from an ideal whistle acoustic transmitter in accordance with embodiments of the invention.
Figure 18B:
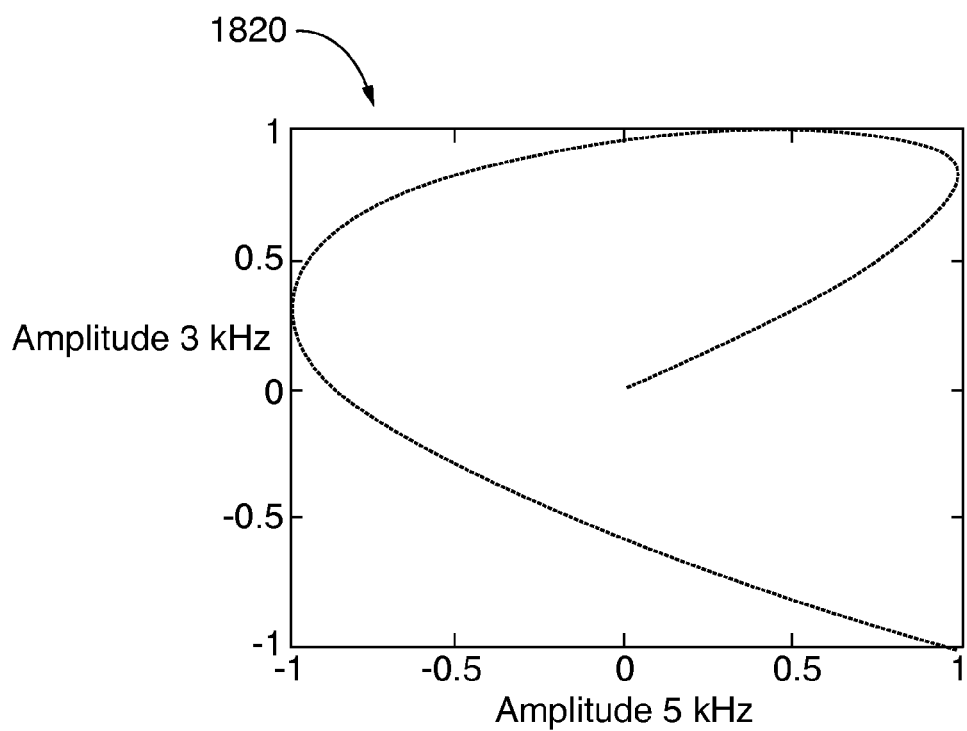
FIG. 18B is a frequency-domain graph showing a multi-frequency acoustic signal from an ideal whistle acoustic transmitter in accordance with embodiments of the invention.

To address the problem of ambiguities within the signal, it is advantageous to design the whistle to incorporate multiple narrow band frequency peaks in the emitted signal. The frequency combinations can be chosen to prevent ambiguities, at least for a period longer than the expected measurement range. One such frequency combination 1810, shown in FIG. 18A, includes a 5 kHz signal 1815 and a 3 kHz signal 1816. When emitting frequencies of 3 kHz and 5 kHz at the same time, the phase combination 1820, shown in FIG. 18B, is unique for more than 0.00025 seconds, which is a greater time period than that for the ambiguity of either the 5 kHz signal (0.0001 seconds) or the 3 kHz signal (0.000167 seconds). A system using a whistle signal with that frequency combination is capable of distinguishing the 0.001 second time-of-flight from the 0.0009 second time-of-flight in the example above. Another approach to limiting ambiguities in the received signals is to use a signal having a single, relatively low frequency, in which the period is sufficient to cover time of flight differences for the expected range of temperatures.

Yet another approach to resolving ambiguities is to use information from other paths, which have different lengths, to infer which temperature of the multiple possible temperatures is correct. For example, if the temperature estimate for one path is 500° C., and the temperature estimate for a neighboring, ambiguous path is either 300° C. or 500° C. then it is more likely that the 500° C. estimate is correct.

The spark gap acoustic source 1430 and the whistle acoustic source 1630 each have certain advantages and disadvantages, as described above. An appropriate acoustic source is selected for an individual application depending on the installation site and operating conditions of the combustor.

At least three alternative types of acoustic microphones may be used in implementing the sensor 1420 of FIG. 14 and the sensor 1620 of FIG. 16. The particular microphone type is selected depending on the environmental temperature and other requirements. The alternatives include piezoelectric sensors, piezoresistive sensors and fiber optic sensors. Fiber optic and piezoresistive microphones have the highest temperature tolerance. Fiber optic sensors furthermore are more sensitive and are immune from electromagnetic interference.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The exemplary engine 10 and exemplary combustor 1200 are shown by way of illustration and not by way of limitation, to clearly describe certain features and aspects of the present invention set out in greater detail herein. However, the various aspects of the present invention described more fully herein may be applied to various combustion engines to monitor and/or detect the occurrence of combustion anomalies. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A transceiver for measuring acoustic properties of a gas in a turbine engine combustor, comprising:
   a housing defining a measurement chamber and having at least a first opening, the housing being adapted for attachment to a turbine engine combustor wall of the turbine engine combustor to permit propagation of acoustic signals between the gas in the turbine engine combustor and gas in the measurement chamber through the first opening;

an acoustic sensor mounted to the housing for receiving acoustic signals propagating in the measurement chamber, wherein the acoustic sensor is in communication with the measurement chamber through a second opening in the housing and wherein the measurement chamber comprises a substantially horn-shaped wave guide between the first opening and the second opening, the wave guide having a first cross sectional area near the first opening that is substantially larger than a second cross sectional area near the second opening; and an acoustic transmitter mounted to the housing for creating acoustic signals within the measurement chamber.

2. The transceiver of claim 1, wherein the housing is a substantially cylindrical housing having first and second ends, the first opening being at the first end of the housing, the acoustic transmitter being at the second end of the housing and the second opening being in a wall of the housing between the first and second ends.

3. The transceiver of claim 1, wherein the acoustic transmitter is a spark generator comprising a spark gap within the measurement chamber and an electrical energy source connected to the spark gap.

4. The transceiver of claim 3, wherein the spark generator further comprises a step-up transformer in proximity to the spark gap to step up a voltage of the electrical energy source.

5. The transceiver of claim 1, wherein the acoustic transmitter is a whistle acoustic signal source.

6. The transceiver of claim 5, wherein the whistle acoustic signal source is activated by a cooling gas flow outside the turbine engine combustor.

7. The transceiver of claim 5, wherein the whistle acoustic signal source is separated from the measurement chamber by a membrane that prevents flow from the measurement chamber and conducts acoustic signals from the whistle acoustic signal source to the measurement chamber.

8. The transceiver of claim 5, wherein the whistle acoustic signal source emits an acoustic signal having one or more dominant frequencies whereby amplitude ambiguities of the acoustic signal are spaced apart by a period longer than a range of expected time-of-flight measurements.

9. The transceiver of claim 1, wherein the acoustic sensor is selected from a group consisting of a piezoelectric microphone, a piezoresistive microphone and a fiber optic microphone.

10. A system for measuring properties of a gas in a turbine engine combustor, comprising:
a first housing mounted to the turbine engine combustor and defining a first measurement chamber in communication with an interior of the turbine engine combustor through a first opening in a wall of the turbine engine combustor, the first opening permitting propagation of acoustic signals between the gas in the turbine engine combustor and gas in the first measurement chamber;
a first acoustic sensor mounted to the first housing for receiving acoustic signals propagating in the first measurement chamber;
a first acoustic transmitter mounted to the first housing for creating acoustic signals within the first measurement chamber;
a controller coupled to the first acoustic sensor and the first acoustic transmitter, the controller further coupled to a second acoustic sensor arranged to receive acoustic signals propagating in the gas in the turbine engine combustor, the controller further coupled to a second acoustic transmitter for creating acoustic signals in the gas in the turbine engine combustor, the controller comprising:
a processor; and
computer readable media containing computer readable instructions that, when executed by the processor, cause the processor to perform the following operations:
transmitting by the first acoustic transmitter a first acoustic signal;
receiving by the second acoustic sensor a signal including contributions from the first acoustic signal;
transmitting by the second acoustic transmitter a second acoustic signal;
receiving by the first acoustic sensor a signal including contributions from the second acoustic signal;
determining times of flight for the first and second acoustic signals including propagation times within the turbine engine combustor;
processing the times of flight to determine the properties of the gas in the turbine engine combustor.

11. The system of claim 10, further comprising:
a second housing mounted to the turbine engine combustor and defining a second measurement chamber in communication with the interior of the turbine engine combustor through a second opening in the wall of the turbine engine combustor, the second opening permitting propagation of acoustic signals between the gas in the turbine engine combustor and gas in the second measurement chamber;
the first and second openings defining a line-of-sound path through the turbine engine combustor;
the second acoustic sensor being mounted to the second housing for receiving acoustic signals propagating in the second measurement chamber.

12. The system of claim 11, wherein the properties of the gas in a turbine engine combustor comprise an average speed of sound along the line-of-sound path, and wherein the operations further comprise:
determining an average temperature of the gas in the turbine engine combustor along the line-of-sound path based on the average speed of sound along the line-of-sound path.

13. The system of claim 11, wherein the properties of the gas in the turbine engine combustor comprise an absolute gas flow velocity along the line-of-sound path, and wherein the operations further comprise:
determining an average temperature of the gas in the turbine engine combustor along the line-of-sound path based on the speed of sound along the line-of-sound path; and
determining the absolute gas flow velocity along the line-of-sound path based on the speed of sound along the line-of-sound path and further based on the temperature of the gas along the line-of-sound path.

14. The system of claim 10, wherein the first and second openings are located in separate axial planes in a combustion zone of the turbine engine combustor containing a flame.

15. The system of claim 10, wherein the first and second openings are located in separate axial planes in an exit zone of the turbine engine combustor proximate a turbine inlet.

16. A method for actively monitoring gas flow characteristics in a turbine engine combustor, comprising:

transmitting, by a first acoustic transmitter, first acoustic signals in a first measurement chamber, the first measurement chamber being in communication with an interior of the turbine engine combustor through a first opening to permit propagation of the first acoustic signals from the first measurement chamber to the interior of the turbine engine combustor;

providing a first acoustic sensor that is in communication with the first measurement chamber through a second opening in the housing;

receiving, by a second acoustic sensor, the first acoustic signals in a second measurement chamber, the second measurement chamber being in communication with the interior of the turbine engine combustor through a second opening to permit propagation of the first acoustic signals from the interior of the turbine engine combustor to the second measurement chamber;

guiding the first acoustic signals from the first opening through the first measurement chamber to the second acoustic sensor by using a substantially horn-shaped wave guide comprising a shape of the first measurement chamber having a first cross sectional area near the first opening that is substantially larger than a second cross sectional area near the second opening;

determining, using a processor, a time-of-flight for the first acoustic signals along a fixed line-of-sound path in the turbine engine combustor from the first opening to the second opening; and processing, via a processor, the time-of-flight to determine the gas flow characteristics in the turbine engine combustor.

* * * * *